(12) United States Patent
Salem

(10) Patent No.: US 11,772,440 B2
(45) Date of Patent: Oct. 3, 2023

(54) MULTI-PURPOSE WHEELS FOR USE IN MULTI-PURPOSE VEHICLES

(71) Applicant: Ali Salem, New York, NY (US)

(72) Inventor: Ali Salem, New York, NY (US)

(73) Assignee: Ali Salem, New York, NY (US)

( * ) Notice: Subject to any disclaimer, the term of this patent is extended or adjusted under 35 U.S.C. 154(b) by 574 days.

(21) Appl. No.: 16/431,222

(22) Filed: Jun. 4, 2019

(65) Prior Publication Data

US 2020/0023701 A1 Jan. 23, 2020

Related U.S. Application Data

(60) Provisional application No. 62/689,828, filed on Jun. 25, 2018, provisional application No. 62/681,691, filed on Jun. 7, 2018, provisional application No. 62/680,345, filed on Jun. 4, 2018.

(51) Int. Cl.
| | |
|---|---|
| *B60F 5/02* | (2006.01) |
| *B64C 37/00* | (2006.01) |
| *B64C 29/00* | (2006.01) |
| *B64C 11/00* | (2006.01) |

(52) U.S. Cl.
CPC ............. *B60F 5/02* (2013.01); *B64C 11/001* (2013.01); *B64C 29/0033* (2013.01); *B64C 37/00* (2013.01)

(58) Field of Classification Search
CPC .................................. B60F 5/02; B64C 37/00
USPC .......................................................... 244/50
See application file for complete search history.

(56) References Cited

U.S. PATENT DOCUMENTS

2019/0120077 A1\* 4/2019 Kempshall .............. B64C 25/34

FOREIGN PATENT DOCUMENTS

| CN | 105329056 | A | * | 2/2016 |
| CN | 104369635 | B | * | 11/2017 |
| CN | 108032693 | A | * | 5/2018 |
| CN | 106080070 | B | * | 8/2018 |
| CN | 108482042 | A | * | 9/2018 |
| CN | 109263418 | A | * | 1/2019 |
| CN | 110053435 | A | * | 7/2019 |
| CN | 111169240 | A | * | 5/2020 |
| CN | 111216498 | A | * | 6/2020 |
| CN | 111319408 | A | * | 6/2020 |
| CN | 111823797 | A | * | 10/2020 |
| CN | 111845232 | A | * | 10/2020 |

(Continued)

*Primary Examiner* — Christopher P Ellis
(74) *Attorney, Agent, or Firm* — Polsinelli PC

(57) ABSTRACT

The present disclosure is directed to a unique design of multi-purpose wheels for use in multi-purpose vehicles capable of operating in different transportation modes in different mediums such as flying mode and driving mode. Advantageous design of multi-purpose wheels and vehicles of the present disclosure allow for easy and convenient change in transportation mode of such vehicles without need for any special purpose transportation infrastructure. In one aspect, a multi-purpose tool includes a first set of blades configured to enable an object to which the multi-purpose tool is attached to operate in a first mode of transportation; a second set of blades configured to enable the object to operate in a second mode of transportation; and an engagement mechanism coupled to the first set of blades and the second set of blades for switching operation of the object between the first mode of transportation and the second mode of transportation.

8 Claims, 23 Drawing Sheets

(56) References Cited

FOREIGN PATENT DOCUMENTS

| CN | 111907274 | A | * | 11/2020 | |
|----|-----------|---|---|---------|---|
| CN | 112078298 | A | * | 12/2020 | |
| CN | 112078299 | A | * | 12/2020 | |
| CN | 112319159 | A | * | 2/2021 | |
| CN | 112319160 | A | * | 2/2021 | |
| CN | 111532430 | B | * | 3/2021 | |
| CN | 112498034 | A | * | 3/2021 | |
| CN | 112693269 | A | * | 4/2021 | |
| CN | 113085459 | A | * | 7/2021 | |
| DE | 102006038182 | A1 | * | 2/2008 | ................ B60T 1/02 |
| KR | 20130065078 | A | * | 6/2013 | |
| KR | 20170058050 | A | * | 5/2017 | |
| KR | 20200066019 | A | * | 6/2020 | |
| KR | 20210018367 | A | * | 2/2021 | |
| WO | WO-2019060933 | A1 | * | 4/2019 | ........... B64C 11/001 |
| WO | WO-2021117054 | A1 | * | 6/2021 | ........... B64C 11/001 |

* cited by examiner

MULTI-PURPOSE WHEELS FOR USE IN MULTI-PURPOSE VEHICLES

CROSS-REFERENCE TO RELATED APPLICATIONS

This application claims priority to U.S. Provisional Patent Application No. 62/680,345 filed on Jun. 4, 2018, U.S. Provisional Patent Application No. 62/681,691 filed on Jun. 7, 2018 and U.S. Provisional Patent Application No. 62/689,828 filed on Jun. 25, 2018, the entire content of each of which is incorporated herein by reference.

BACKGROUND

Field of the Disclosure

The present disclosure is directed to transportation vehicles and more particularly, to multi-purpose tools that allow movement and operation of multi-purpose vehicles capable of operation on any given type of surface or medium.

Description of the Related Art

A conventional wheel is used to give direction to driven vehicles and enable a vehicle to move. In aircrafts, the lifting force is produced by accelerating the air stream either on a fixed wing or a rotary wing or a hybrid configuration. A personal air vehicle is a road able vehicle with flying capability. Several working road able aircrafts are currently available in the market. A vertical takeoff and landing road able aircraft is a vehicle with integrated ducted fans to lift the vehicle separately. An auto gyro road able aircraft uses a separate huge rotary wing for providing lift and a propeller for providing forward thrust. A small plane with retractable wings that has both the capacity to fly and drive conveniently along roads and on land can be recognized as a road able aircraft too. Current designs of road able vehicles show limitations in many aspects such as safety, transport infrastructure, over weighting and user loading as various components should be integrated separately to implement underlying functionalities related to air based or land based transportation.

SUMMARY

One or more example embodiments of inventive concepts are directed to a unique design of multi-purpose wheels for use in multi-purpose vehicles capable of moving and operation in different transportation modes in different mediums such as flying mode and driving mode. Advantageous design of multi-purpose wheels and vehicles of the present disclosure allow for easy and convenient change in transportation mode of such vehicles without need for any special purpose transportation infrastructure.

In one aspect, a multi-purpose tool includes a first set of blades configured to enable an object to which the multi-purpose tool is attached to operate in a first mode of transportation; a second set of blades configured to enable the object to operate in a second mode of transportation; and an engagement mechanism coupled to the first set of blades and the second set of blades for switching operation of the object between the first mode of transportation and the second mode of transportation.

In another aspect, the first mode of transportation is a driving mode of transportation and the second mode of transportation is a flying mode of transportation.

In another aspect, the multi-purpose tool further includes a third set of blades configured to enable the object to operate in a third mode of transportation.

In another aspect, the third mode of transportation is a sailing mode of transportation.

In another aspect, the object is one of a drone, a motorcycle, a car or a boat.

In another aspect, the engagement mechanism is connected to a power source of the object via a movable arm.

In another aspect, the movable arm is configured to adjust orientation of the multi-purpose tool when switching from the first mode of transportation and the second mode of transportation.

In another aspect, the multi-purpose tool is a wheel.

In another aspect, the first set of blades and the second set of blades are radially connected to inner walls of a rim of the wheel and are coupled to the engagement mechanism at a center of the wheel.

In another aspect, the engagement mechanism is an electromagnetic clutch.

In one aspect, a multi-modal moving object includes a plurality of tools, each of which is configured to operate to allow for operation of the multi-modal moving object in one of a plurality of transportation modes; and a controller configured to control each of the plurality of tools to switch between two of the plurality of modes.

In another aspect, the plurality of tools are a plurality of wheels and the plurality of transportation modes includes at least a driving transportation mode, a flying transportation mode and a sailing transportation mode.

In another aspect, the multi-modal moving object further includes an engagement mechanism coupled to each of the plurality of tools and the controller, the engagement mechanism configured to one of engage or disengage any given one of the plurality of tools to allow for operation of the multi-modal moving object in one of the plurality of transportation modes.

In another aspect, the controller is coupled to the plurality of tools via a corresponding moving arm.

In another aspect, the corresponding moving arm is configured adjust orientation of the plurality of tools when switching from one transportation mode to another.

In another aspect, the multi-modal moving object further includes a plurality of wheels to each of which the plurality of tools are attached, each of the plurality of tools having a corresponding plurality of blades configured to spin to allow for operation of the multi-modal moving object in one of the plurality of transportation modes In another aspect, each of the plurality of blades is radially connected to inner walls of each of the plurality of wheel at one end and to an engagement mechanism at a center of each of the plurality of wheels.

In another aspect, the engagement mechanism is an electromagnetic clutch.

In another aspect, the engagement mechanism is configured to lock two or more of the plurality of blades to one another for allowing operation of the multi-modal moving object in driving transportation mode.

In another aspect, the engagement mechanism is configured to disengage two or more of the plurality of blades from one another for allowing operation of the multi-modal moving object in flying transportation mode or driving transportation mode.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

Initially, a number of non-limiting examples of multi-purpose vehicles will be described below with reference to FIGS. 1 and 2 in which multi-purpose wheels of the present disclosure may be used.

As used herein, the terms "first", "second", and "third" may be used interchangeably to distinguish one component from another and are not intended to signify location or importance of the individual components.

Figure 1A:
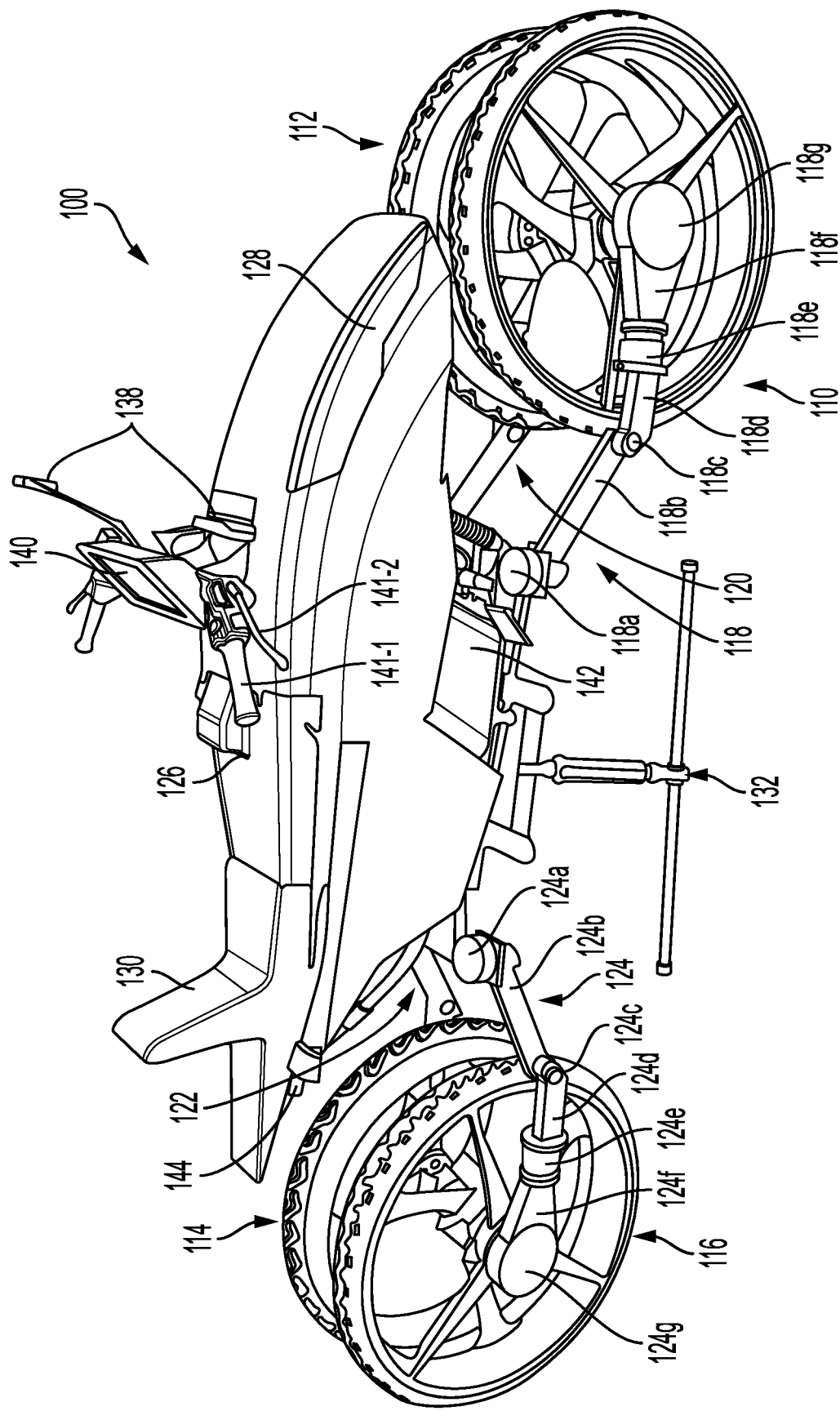
FIGS. 1A-B illustrate an example multi-purpose vehicle, according to one aspect of the present disclosure.
Figure 1B:
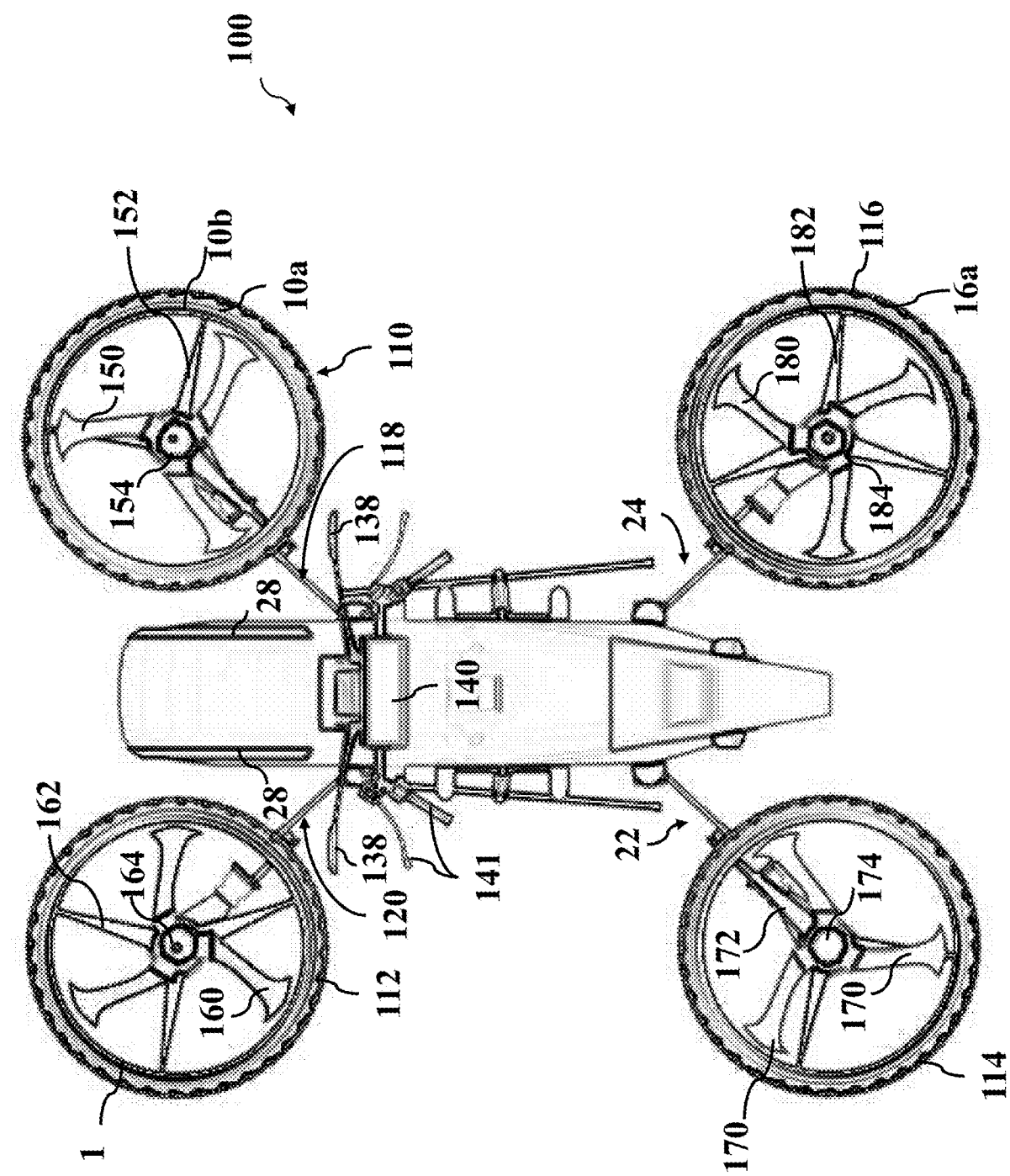

FIGS. 1A-B illustrate an example multi-purpose vehicle, according to one aspect of the present disclosure. Referring to FIG. 1A, multi-purpose vehicle 100, capable of operating in both ground transportation mode and flying transportation mode (e.g., a motorcycle capable of flying), is shown in a ground operational mode where all movable arms 118, 120, 122 and 124 are closed and all wheels 110, 112, 114 and 116 are positioned on the ground. The movable arms 118, 120, 122 and 124 have at least one degree of freedom and can be made of any known or to be developed material including, but not limited to, metals, plastic, fiber optic material, etc. Movable arm 118 has several components including beams 118b and 118d, actuator (motor) or engagement mechanism 118a and 118e for turning the wheel up side or in any other direction, an electromagnetic actuator 118c for engaging or disengaging and a gearbox 118g for the wheel as well shock absorbers 118d. As shown in FIG. 1A, actuator 118a is placed at the end of the movable arm 118 and is connected to beam 118b. The actuator motor 118a can pivot the entire arm 118 around at its local axes and the middle actuator motor 118e can pivot wheel 110 around its local axes. The skid joint/beam 118f connects the actuator 118e to the gearbox 118g. The spring 118c is a part of the front suspension system, which may function as a shock absorber and stores rotational energy resulting more riding comfortably during the road transportation. The root actuator motor 118a may pivot the movable arm 110 along any rotational axis and the middle actuator 118e may pivot the wheel 110 along any rotational axis. The root actuator motor 118a has at least one degree of freedom (may have more than one such as two or three degrees of freedom, etc.). The movable arm 110 can have at least on rigid part or a number of rigid bodies and shock absorbers. The actuator 118g can be a source of power as well, which case, actuator 118g may spin the props or blades for generating thrust for flying as well as supporting the wheels torque and force motion needs in ground mode.

Each of movable arms 120, 122 and 124 may have corresponding number of components as movable arm 118. For example, each of components 120a-g, as identified in FIG. 1A has the same functionalities as corresponding one of components 118a-g (e.g., 120a is same as 118a, 120b is same as 118b, etc.) Furthermore, each of components 122a-g, as identified in FIG. 1A has the same functionalities as corresponding one of components 118a-g (e.g., 122a is same as 118a, 122b is same as 118b, etc.) Lastly, each of components 124a-g, as identified in FIG. 1A has the same functionalities as corresponding one of components 118a-g (e.g., 124a is same as 118a, 124b is same as 118b, etc.). Accordingly, components 120a-g, 122a-g and 124a-g will not be further described for sake of brevity.

In one example, instead of each wheel having a dedicated movable arm, there may be a single movable arm (front movable arm) for controlling the front pair of wheels (e.g., wheels 110 and 112) and a single movable arm (rear movable arm) for controlling rear pair of wheels (e.g., wheels 114 and 116). This example configuration will be described with reference to FIGS. 20A-B.

Furthermore, as multi-purpose vehicle 100 switches between flying and driving transportation modes, wheels 110, 112, 114 and 116 may simultaneously switch orientation (e.g., from vertical to horizontal for flying and from horizontal to vertical for driving) by using landing gear 132 as a pivot and anchor. Landing gear 132 may be adjustable such that when multi-purpose vehicle 100 is switching to flying mode, landing gear 132 may extend to lift multi-purpose vehicle 100 up to allow for change of orientation of wheels 110, 112, 114 and 116 from vertical to horizontal. After takeoff, landing gear 132 may be retracted similar to landing gear of a conventional airplane. Furthermore, when multi-purpose vehicle 100 is transitioning from flying mode to driving mode, landing gear 132 may be extended for multi-purpose vehicle 100 to land thereon, switch orientation of wheels 110, 112 and 114 from horizontal to vertical and finally retract landing gear 132 to lower multi-purpose vehicle 100 in order for wheels 110, 112, 114 and 116 to make contact with road surface for driving mode.

Main cover 126 of multi-purpose vehicle 100 covers all the central frames with seat 130 positioned thereon. Material from which main cover 126 and/or seat 130 are made can be any type of known or to be developed material suitable for use as main cover 126 or seat 130. Seat 130 is positioned on main cover 126. Size of seat 130 may vary from one multi-purpose vehicle to another or may be adjustable so that more than a single passenger may be able to sit on and use multi-purpose vehicle 100.

Power source 142, which can be any source of energy (e.g., an internal combustion engine, an electromagnetic engine, a jet engine, an electric power source, a solar power source, a hydrogen or water based power source and more generally any type of known or to be developed power source is placed inside main cover 126. Front Light Emitting Diodes (LEDs) 128 and rear LED 144 provide needed lighting system for multi-purpose vehicle 100. While not shown, there may be additional LEDs placed all around multi-purpose vehicle 100 for better illumination during nighttime transportation, for example.

While LEDs are used as one example of lighting system of multi-purpose vehicle 100, the present disclosure is not limited thereto and any type of known or to be developed suitable lighting system at front, back and/or sides of multi-purpose vehicle 100 may be used.

With an operator/driver in seat 130, display 140 may provide various tools for driver/operator to control operation of multi-purpose vehicle 100. Display 140 may be any type of known or to be developed interactive display capable of receiving inputs and/or display information such as an LCD touch display.

Display 140 may be used by operator/driver of multi-purpose vehicle 100 to control movement and various functionalities of multi-purpose vehicle 100 including, but not limited to, turning multi-purpose vehicle 100 on and off, speed of multi-purpose vehicle 100, lighting, control of various components such as opening and closing wheels 110, 112, 114 and 116, switching between flying and driving transportation modes, any audio/video capabilities.

Multi-purpose vehicle 100 further includes handlebars/driving wheel 141, which allow operator/driver to control direction and speed of movement of multi-purpose vehicle 100. Handlebar 141 may have a front portion 141-1 and a back portion 141-2. Front portion 141-1 may be rotatable for adjusting and changing speed of movement of multi-purpose vehicle 100 while back portion 141-2 may function as a break that upon activation/pressing may engage break system of multi-purpose vehicle 100 to slow down or bring to a stop the movement of multi-purpose vehicle 100. There may also be one or more buttons (mechanical or electrical/virtual) for controlling various functions of multi-purpose vehicle 100 (e.g., changing gear, turning lights on and off, etc.)

Multi-purpose vehicle 100 may also include mirrors 138 attached to handlebars 141.

Additionally, multi-purpose vehicle 100 may be equipped with communication components allowing it to communicate wirelessly with other multi-purpose vehicles in its vicinity, a control center such as a traffic control center for managing air traffic or ground traffic, etc. Such communication capabilities may be enabled and controlled via display 140. Additionally, multi-purpose vehicle 100 may be equipped various known or to be developed short range wireless communication technologies to connect to and/or be controlled by a mobile device of a passenger using multi-purpose vehicle 100. In addition, display 140 may have one or more plugin inputs to which a mobile device may be coupled using a USB cable, for example, to provide additional capabilities such as playing music, video, etc.

While not shown in FIG. 1A, multi-purpose vehicle 100 can also include an exhaust for exhausting burned fuel and energy storage component, which can be any type of known or to be developed battery pack such as a lithium-polymer battery pack. Energy storage component can also be a fuel tank for storing fuel for power source 142.

Referring to FIG. 1B, multi-purpose vehicle 100 is shown in a flight operational mode. Components of FIG. 1B with same reference numerals as in FIG. 1A are the same as their counterpart in FIG. 1A and will be not be further described for sake of brevity. As shown in FIG. 1B, all movable arms 118, 120, 122 and 124 are in open position for flight operational mode.

Similar to FIG. 1A, FIG. 1B illustrates more clearly that wheels 110, 112, 114 and 116 are placed on end movable arms 118, 120, 122 and 124. Each wheel may comprise of a flying propeller and driving blades. For example, wheel 110 includes a flying propeller 150 and driving blades 152. Flying propeller 150 may have one or more arms (e.g., three as shown in FIG. 1B) that radially extend from inside of a rim of wheel 110 to an engagement mechanism 154. Similarly, wheel 112 includes a flying propeller 160 and driving blades 162. Flying propeller 160 may have one or more arms (e.g., three as shown in FIG. 1B) that radially extend from inside of a rim of wheel 112 to an engagement mechanism 164. Similarly, wheel 114 includes a flying propeller 170 and driving 172. Flying propeller 170 may have one or more arms (e.g., three as shown in FIG. 1B) that radially extend from inside of a rim of wheel 114 to an engagement mechanism 174. Similarly, wheel 116 includes a flying propeller 180 and driving blades 182. Flying propeller 180 may have one or more arms (e.g., three as shown in FIG. 1B) that radially extend from inside of a rim of wheel 116 to an engagement mechanism 184. Flying propellers, blades, engagement mechanism and rims of each of wheels 110, 112, 114 and 116 will be further described below.

Figure 2:
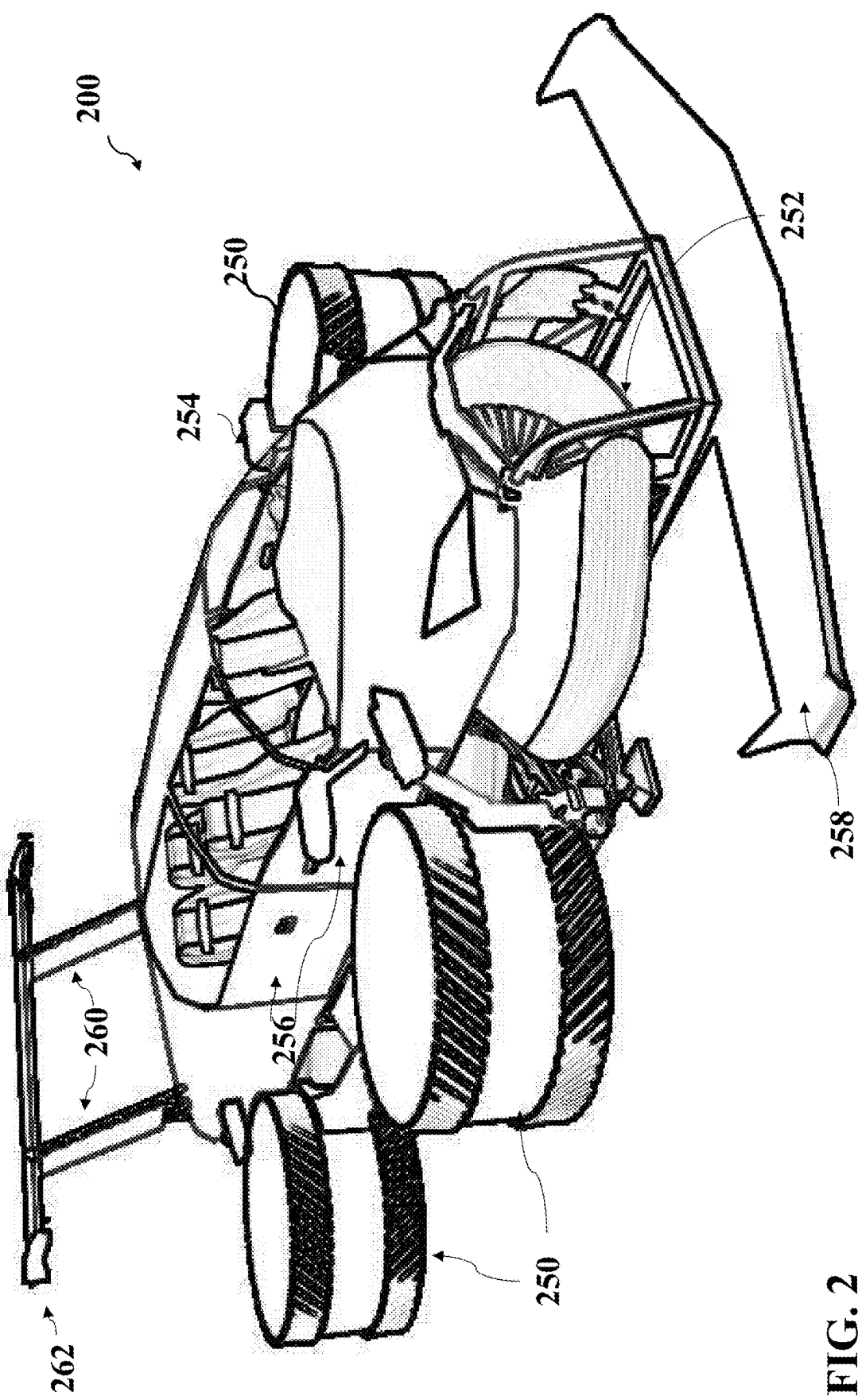
FIG. 2 illustrates another example multi-purpose vehicle, according to one aspect of the present disclosure.

FIG. 2 illustrates another example multi-purpose vehicle, according to one aspect of the present disclosure. In comparison with FIGS. 1A-B, example multi-purpose vehicle 200 of FIG. 2 is a 4-wheel drive ground transportation vehicle capable of operation in both ground transportation mode and flying transportation mode.

Multi-purpose vehicle 200 of FIG. 2A is shown in transition between ground transportation mode to flying transportation mode (take off). For takeoff, the rotary hinge arms (not show), to which wheels 250 are attached (FIG. 2A only illustrates three of the four wheels 50) rotates each wheel 250 of the vehicle from vertical position to be in horizontal position. Air flow enters front intake 252 and jet airstream is exhausted from front and rear wheels 250 for multi-purpose vehicle 200 to take off. The vehicle is equipped with side mirrors 254. Multi-purpose vehicle 200 may be equipped with one or more doors 256 for users and passengers to enter and exit multi-purpose vehicle 200. In one example, front lifting canard 258 is used for more safety and preventing multi-purpose vehicle 200 from stalling. Vertical rudders 260 are a controlling surface for multi-purpose vehicle 200 yaw control. Horizontal controlling surface 262 is a pitch control surface for multi-purpose vehicle 200.

Multi-purpose vehicle 200 may have many variations, in design and functionality, as well as additional features and components not described herein. All such design and functionality variations fall within the scope of the present disclosure and a person of ordinary skill in the art can easily understand and is able to apply the concepts described herein to such variations of multi-purpose vehicle 200 and/or similarly variations of multi-purpose vehicle 100. As one such contemplated variation, multi-purpose vehicle 100 and/or 200 may not only be limited to ground and flying transportation modes but may be capable of being seaborne and thus sailing. As will be described below, design and functionalities of multi-purpose wheels of the present disclosure allow for all such multi-purpose (air, land and sea) vehicles to easily switch between different modes without need to special runways, tracks, etc. Simply and instantaneously, such multi-purpose vehicles using multi-purpose wheels of the present disclosure can switch from one transportation model to another, which advantageously allows for more convenient and significantly more practical multi-purpose vehicles to be deployed and function within current transportation infrastructures available without any significant need of upgrading or modifying the existing infrastructures.

Another example of a multi-purpose vehicle within the scope of the present disclosure is a drone capable of flying, sailing and/or ground transportation, which can be equipped with multi-purpose wheels of the present disclosure and have additional storage capability for carrying and delivering packages from one location to another. Such drone may be an unmanned vehicle that can be remotely controlled and operated using any known or to be developed method of operation of unmanned vehicles.

With two non-limiting examples of multi-purpose vehicles being described, the present disclosure now turns to example embodiments of various aspects of wheels 110, 112, 114, 116 and 250. While FIGS. 3-9 will be described with reference to one of multi-purpose wheels (e.g., multi-purpose wheel 110) of FIG. 1, concepts described with reference to FIGS. 3-9 are equally applicable to multi-purpose wheels 112, 114, 116 and 250 of multi-purpose vehicle 200 of FIG. 2.

Figure 3:
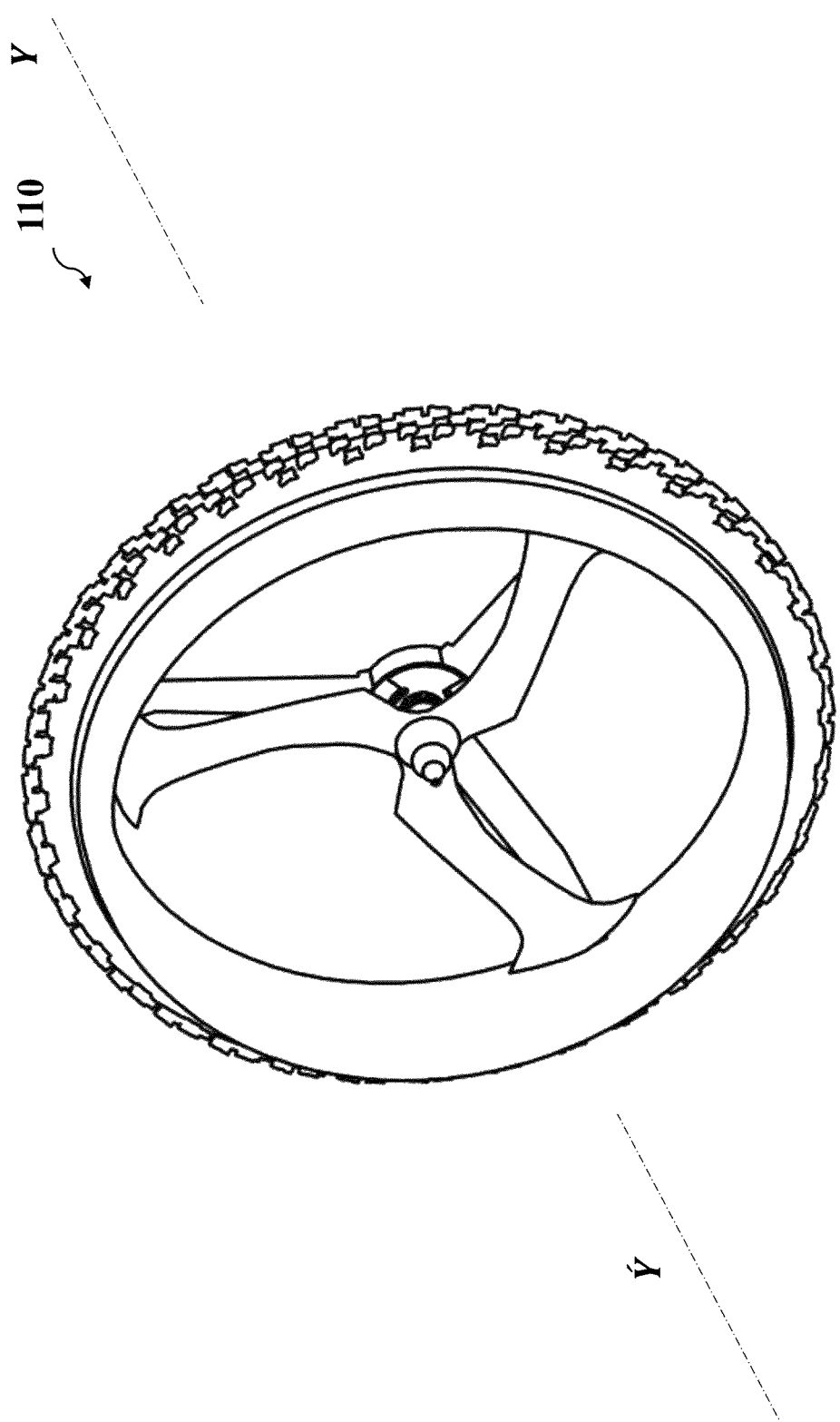
FIG. 3 is a perspective view of a multi-purpose wheel, according to one aspect of the present disclosure.

FIG. 3 is a perspective view of a multi-purpose wheel, according to one aspect of the present disclosure. As shown in FIG. 3, multi-purpose wheel 110 has tire 300 formed of, for example, pneumatic material or airless tire and similar tracks for having a better traction and a better performance. Circular beam 302 fixes tire 300 to ducted rim 304. Ducted rim 304 may function as a frame bay for housing all mentioned components such as actuator, blades or propellers such as propellers and blades as well as a noise reduction tools and sensors.

Multi-purpose wheel 110 also has two sets of blades. The first set of blades may form flying propeller 150 formed of three blades that extend radially to connect/attach to ducted rim 304 on one end and engagement mechanism 154 at the hub 306 of multi-purpose wheel 110. Flying propeller 150 may be used for enabling flying mode transportation for a vehicle on which multi-purpose wheel 110 is installed.

The second set of blades 152 may similarly be formed of three blades that extend radially to connect/attach to ducted rim 304 on one end and engagement mechanism 154 at the hub 306 of multi-purpose wheel 110. The second set of blades 152 may be used for enabling driving mode transportation for a vehicle on which multi-purpose wheel 110 is installed. Therefore, second set of blades 152 may be referred to as driving blades 152.

While in FIG. 3 and throughout this disclosure, each set of blades is shown as having three blades extending radially, the present disclosure is not limited to. For example, flying propeller 150 and driving blades 152 may be formed of more or less blades. Engagement mechanism 154 may also include pitch adjustment knob 308 for adjusting the pitching angle of blades of flying propeller 150 relative to the horizontal axis Y-Y'

As briefly mentioned above, flying propeller 150 and the plurality of blades may be connected at the center to engagement mechanism 154. As will be described in more detail below, engagement mechanism 154 may be controlled electrically and/or mechanically to engage (lock together) or disengage (separate) blades of flying propeller 150 from the driving blades 152. Once engaged and locked together, multi-purpose wheel 110, via the driving blades 152, spins and allows a multi-purpose vehicle on which it is installed to operate in driving mode and once disengaged, multi-purpose wheel 110, via flying propeller 150, allows a multi-purpose vehicle on which it is installed to operate in flying mode.

In more detail, engagement mechanism 154 is used to switch the rotary motion between the wheel, using driving blades 152 and flying propeller 150. When engagement mechanism 154 engages (locks together) driving blades 152 and blades of flying propeller 150, since ducted rim 304 is connected to the driving blades 152, entire multi-purpose wheel 110 starts to rotate and when the engagement mechanism 154 is disengaged, only flying propeller 150 can be rotated. Engagement mechanism 154 is a tool to transfer the power flow between driving blades 152 and flying propeller 150. Engagement mechanism 154 can be either a multi-plate engaging mechanism or an electric engaging mechanism. For example, one possible form of engaging mechanism 154 is an electromagnetic clutch. When clutch engages both flying propeller 150 and driving blades 152, driving blades 152 cause wheel 110 to rotate while blades of flying propeller 150 are also rotating. However, when the clutch (engagement mechanism 154) disengages the driving blades 152 and flying propeller 150, only driving blades 152 or flying propeller 150 can spin by the power source 142. The other example of engaging mechanism 154 is a gearbox where it can be used to spin the wheels independent of the flying propeller 150. Therefore, power source 142 functions to actuate and spin driving blades 152 and/or flying propeller 150 while gearbox functions to spin wheel 110 during driving transportation mode.

Various components of multi-purpose wheel 110 including flying propeller 150, driving blades 152, circular beam 304 and ducted rim 306 may be made of aluminum or any other sufficiently light, rigid and strong material such as high-strength plastic, fiber carbon, composite materials and the like.

Figure 4:
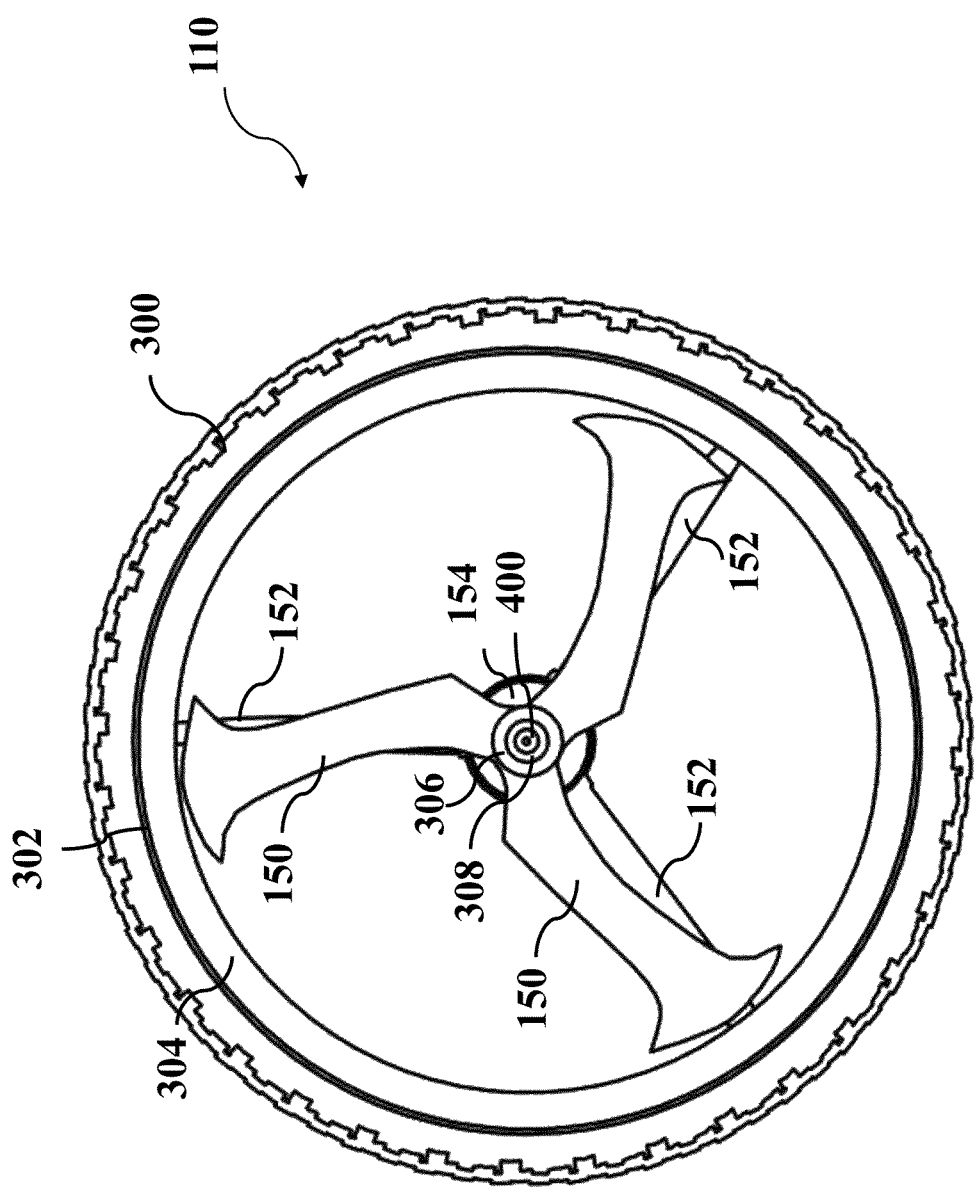
FIG. 4 is a front view of multi-purpose wheel of FIG. 3, according to one aspect of the present disclosure.

FIG. 4 is a front view of multi-purpose wheel of FIG. 3, according to one aspect of the present disclosure. All elements in FIG. 4 with same reference numeral as their corresponding elements in FIG. 3 will not be described again for sake of brevity. In comparison to FIG. 3, FIG. 4 shows that engagement mechanism 154 further includes spinner 400, which is used to create aerodynamic streamlining over flying propeller 150. Turbulent air flow have negative effect on blades and propeller operation. Putting this mechanism in the intake of duct result a more laminar air flow.

Figure 5:
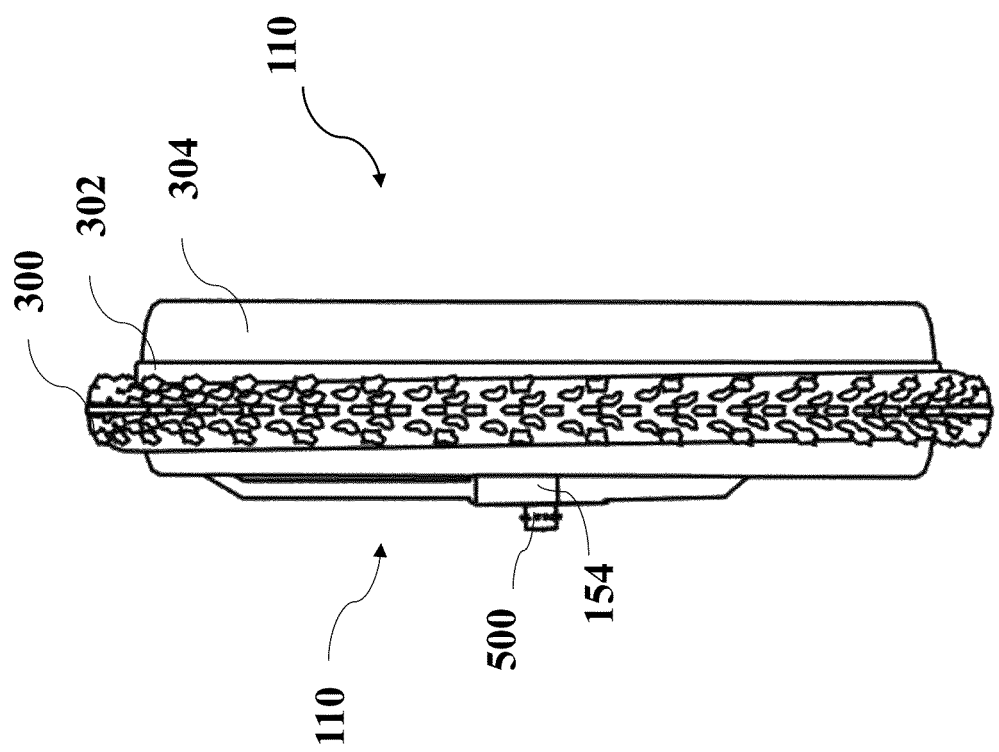
FIG. 5 is a side view of multi-task wheel of FIG. 3, according to one aspect of the present disclosure.

FIG. 5 is a side view of multi-task wheel of FIG. 3, according to one aspect of the present disclosure. All elements in FIG. 4 with same reference numeral as their corresponding elements in FIG. 3 will not be described again for sake of brevity. In comparison to FIG. 3, FIG. 5 illustrates that engagement mechanism 154 also includes driving rotary shaft 500 that is a part of power flow from power source (e.g., power source 142) connected to turning axial of engine of multi-purpose vehicle 100, which can be an internal combustion engine or an electric engine or magnetic actuators. Driving rotary shaft 500 is used to either turn flying propeller 150 or turn multi-purpose wheel 110 using driving blades 152. This switch functionality can, for example, be controlled by the user input via display 140.

Figure 6:
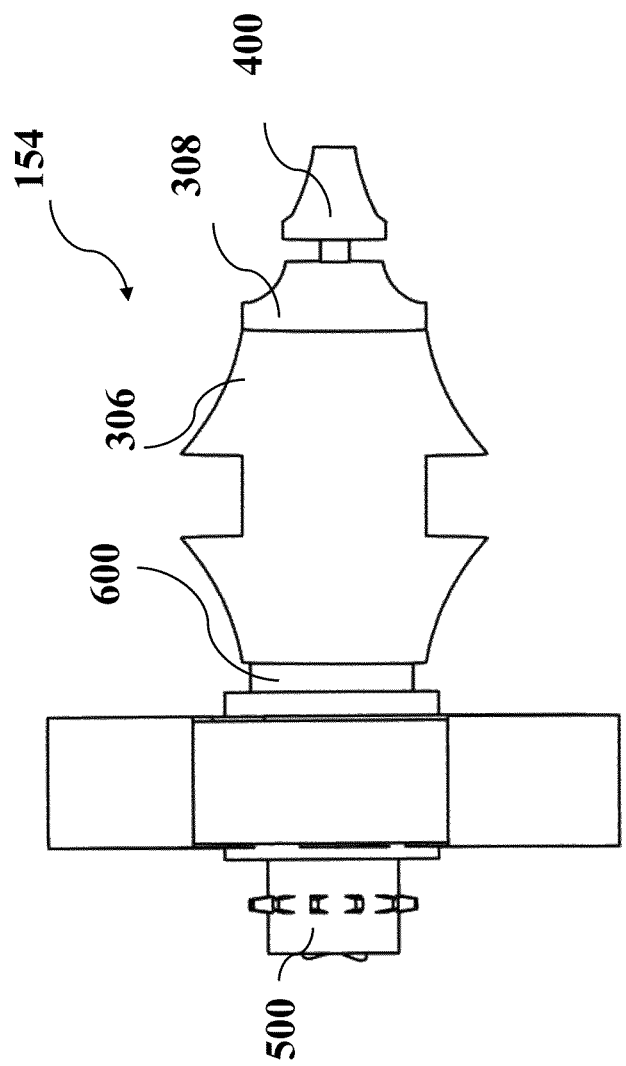
FIG. 6 is an example of engagement mechanism of multi-purpose wheel, according to an aspect of the present disclosure.

FIG. 6 is an example of engagement mechanism of multi-purpose wheel, according to an aspect of the present disclosure. As shown in FIG. 6, engagement mechanism 154 has driving rotary shaft 500 (described above with reference to FIG. 5), which turns engagement mechanism shaft 600. A flying propeller such as flying propeller 150 of FIG. 3 is fixed to hub 306 and engagement mechanism shaft 600 turns hub 306 and thereby blades of flying propeller 150. Spinner locking 400 (described above with reference to FIG. 4) is mounted for creating aerodynamic streamlining over the attached flying propeller (e.g., flying propeller 150 of FIG. 3). Engagement mechanism shaft 600 is used to turn the flying propeller and is directly connected to driving rotary shaft 500. Pitch adjustment knob 308 (described above with reference to FIG. 3) can be a manual device or a more advanced electro mechanical device.

Figure 7:
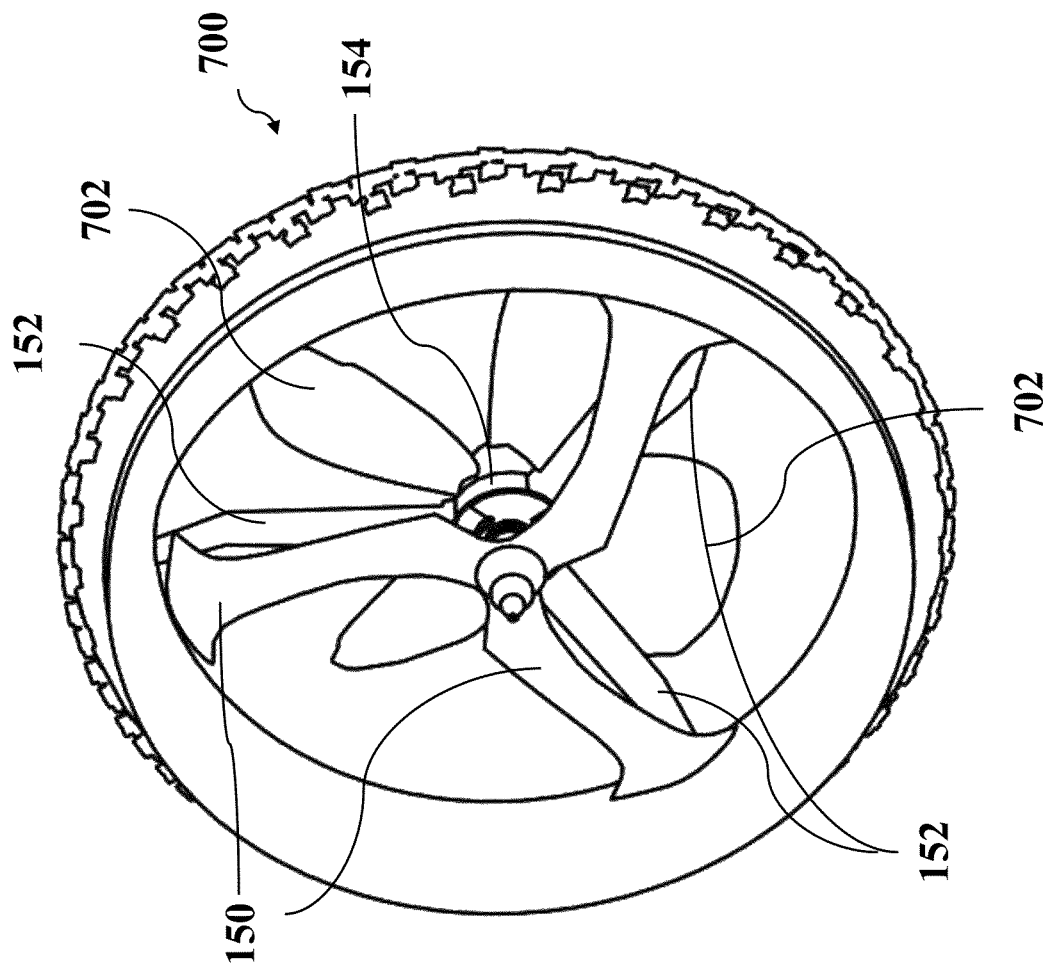
FIG. 7 is a perspective view of a multi-purpose wheel, according to one aspect of the present disclosure.

FIG. 7 is a perspective view of a multi-purpose wheel, according to one aspect of the present disclosure. Multi-purpose wheel 700 of FIG. 7 is different from multi-purpose wheel 110 described with reference to FIGS. 3-6 only in that multi-purpose wheel 700 is adjusted to allowing the multi-purpose vehicle to which its connected to operate in driving, flying as well as sailing (at sea and on water) transportation modes by appropriately adding sailing propeller 702 to already existing flying propeller 150 and driving blades 152, where all three are coupled to engagement mechanism 154, which allows for operation (engaging) of any given one (e.g., driving blades 152 for driving mode, flying propeller 150 for flying mode and sailing propeller 702 for sailing mode) while the remaining two are disengaged (e.g., flying propeller 150 and sailing propeller 702 are disengaged when driving blades 152 are engaged, driving blades 152 and sailing propeller 702 are disengaged when flying propeller 150 is engaged, and driving blades 152 and flying propeller 702 are disengaged when sailing propeller 702 is engaged). Alternatively, any combination of two (and not all three) of flying propeller 150, driving blades 152 and sailing propeller 154 may be used for providing corresponding multi-purpose wheel, which will be described below with reference to FIGS. 8 and 9.

Figure 8:
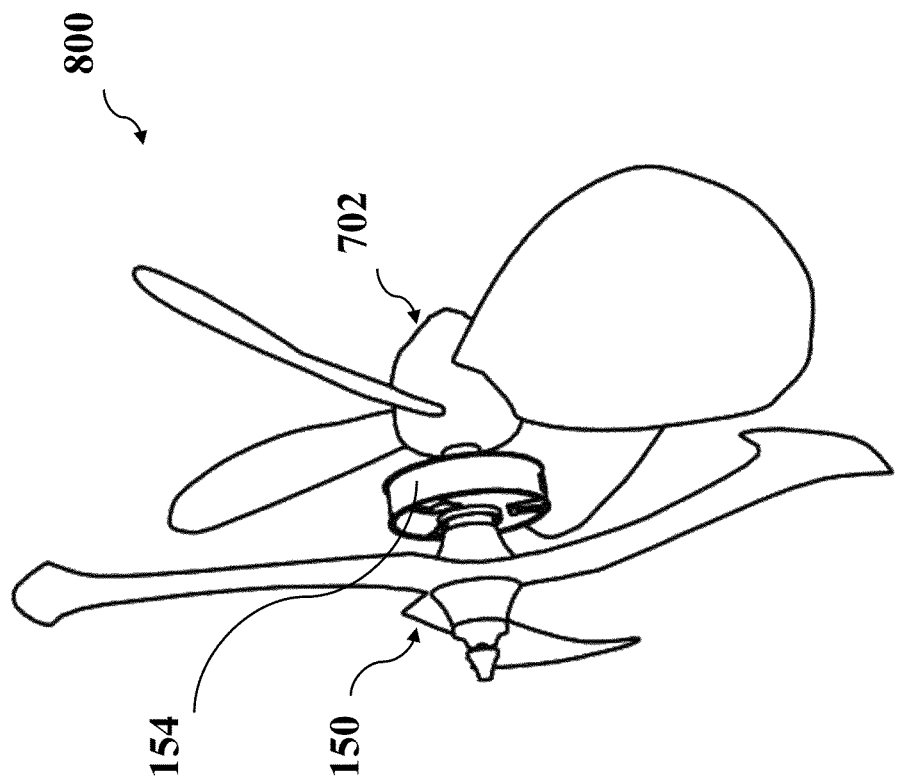
FIG. 8 is a multi-purpose tool for sailing and flying modes of transportation, according to one aspect of the present disclosure.

FIG. 8 is a multi-purpose tool for sailing and flying modes of transportation, according to one aspect of the present disclosure. As can be seen from FIG. 8, multi-purpose tool 800 is different from multi-purpose wheels of FIGS. 3-7 in that multi-purpose tool 800 no longer has the tire 300, circular beam 302 and ducted rim 304 as multi-purpose tool 800 is used for flying mode and sailing mode of transportation but not for driving mode. As shown, multi-purpose tool 800 includes flying propeller 150 and sailing propeller 702 connected/attached to engagement mechanism 154. As shown in FIG. 8, shapes and sizes of blades of flying propeller 150 and sailing propeller 702 may be different and based on experiments and or empirical studies. Furthermore, blades of flying propeller 150 and sailing propeller 702 may be made of any type of known or to be developed material suitable for their functioning for the intended underlying purposes.

Figure 9:
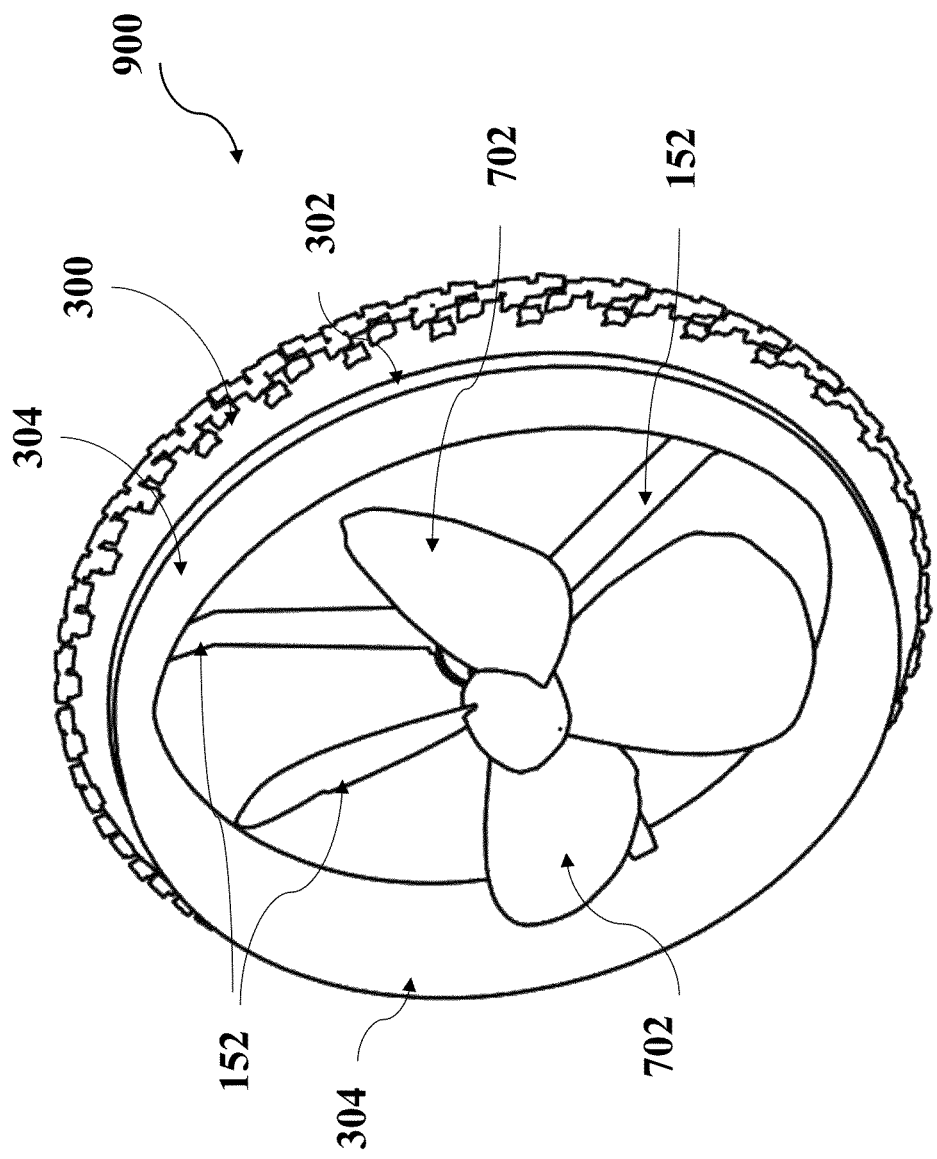
FIG. 9 is a multi-purpose wheel for sailing and driving modes of transportation, according to one aspect of the present disclosure.

FIG. 9 is a multi-purpose wheel for sailing and driving modes of transportation, according to one aspect of the present disclosure. As can be seen from FIG. 9, multi-purpose wheel 900 is different from multi-purpose wheels of FIGS. 3-7 and multi-purpose tool 800 of FIG. 8, in that multi-purpose wheel 900 includes driving blades 152 and sailing propeller 702 connected/attached to engagement mechanism 154, with tire 300, circular beam 302 and ducted rim 304. As shown in FIG. 9, shapes and sizes of driving blades 152 and sailing propeller 702 may be different and based on experiments and or empirical studies. Furthermore, blades of driving blades 152 and sailing propeller 702 may be made of any type of known or to be developed material suitable for their functioning for the intended underlying purposes.

Figure 10:
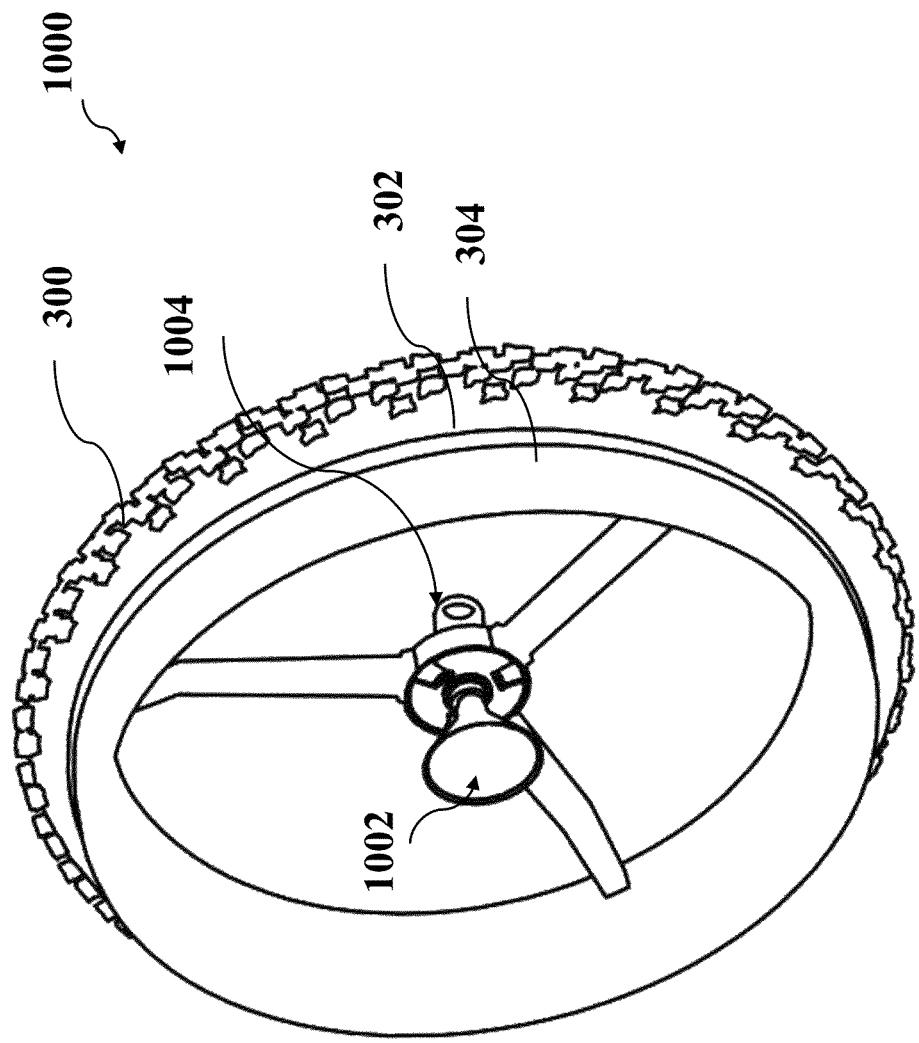
FIG. 10 is a perspective view of a multi-purpose wheel, according to one aspect of the present disclosure.

FIG. 10 is a perspective view of a multi-purpose wheel, according to one aspect of the present disclosure. Multi-purpose wheel 1000 is different from multi-purpose wheels and tools described above with reference to FIGS. 3-9 and in particular is different from multi-purpose wheel 700 in that instead of flying propeller 150 and/or sailing propeller 702, multi-purpose wheel 1000 has nuzzle 1002 of high pressure jet of air used for flying mode transportation and nuzzle 1004 of high pressure jet of water is used for sailing mode of transportation. Nuzzles are part of a jet stream flow mechanism that can vector the thrust from one direction to any desire direction.

FIGS. 3-10 provide various examples of multi-purpose wheels/tools that can be used on vehicles (such as motorcycles, cars, drones, boats, etc.) to convert such vehicles into multi-purpose vehicles capable of operation in two or more different transportation modes such as driving, flying and sailing transportation modes. However, the present disclosure is not limited to just the configurations of multi-purpose wheel with radially connecting wheels. Alternatively, a bladeless electromagnetic multi-purpose wheel can also be used, which will be described below with reference to FIG. 21.

With examples of multi-purpose wheels described, the description now returns to operation of multi-purpose vehicle 100 of FIGS. 1A-B, on which four of multi-purpose wheels described with reference to FIGS. 3-10 are installed as wheels 110, 112, 114 and 116. Such multi-purpose wheels can also be installed as wheels 250 on multi-purpose vehicle 200 of FIG. 2.

Figure 11:
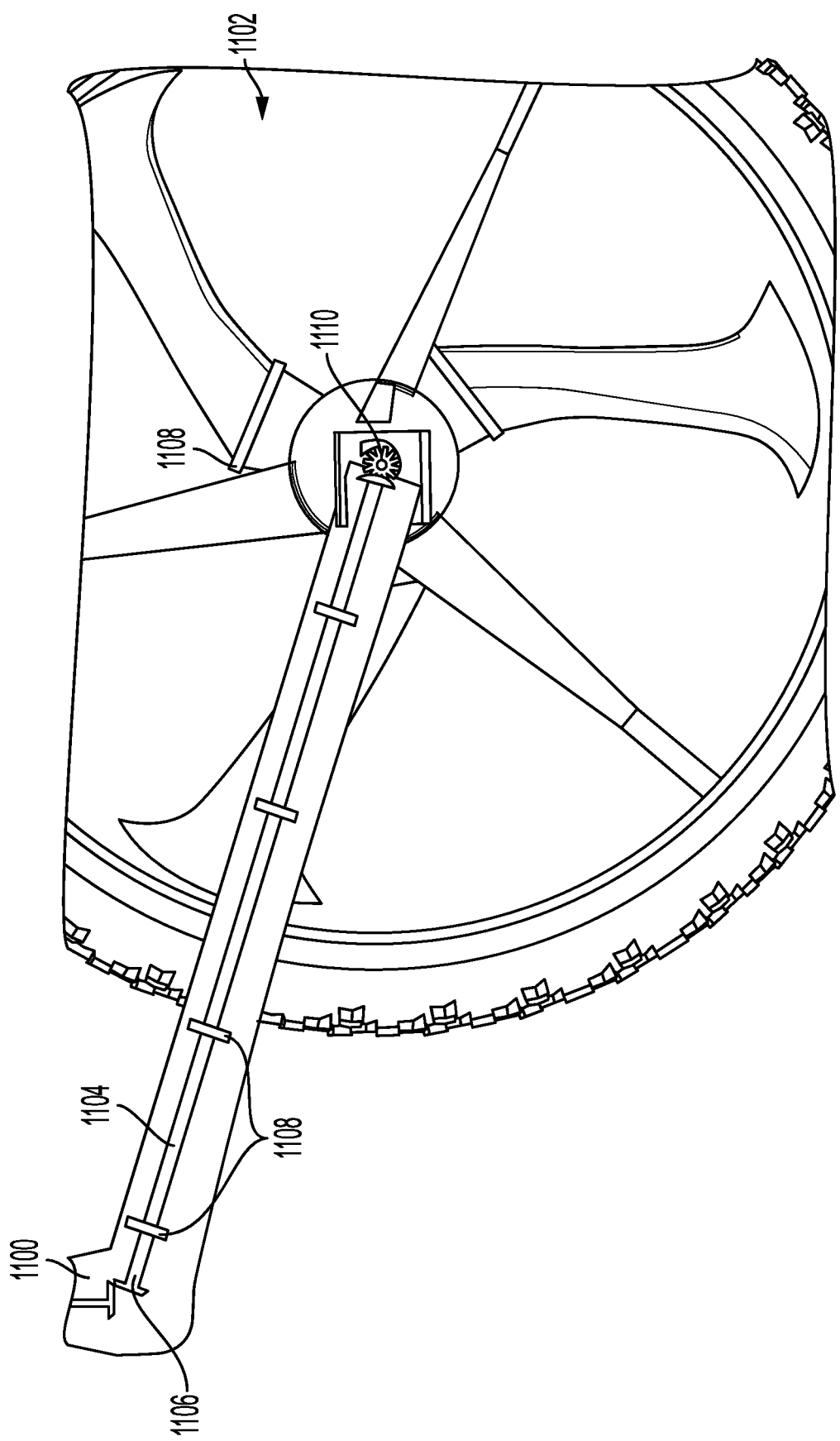
FIG. 11 illustrates a zoomed in connection between movable arm and one multi-purpose wheel of multi-purpose vehicle of FIGS. 1A-B, according to an aspect of the present disclosure.

FIG. 11 illustrates a zoomed in connection between movable arm and one multi-purpose wheel of multi-purpose vehicle of FIGS. 1A-B, according to an aspect of the present disclosure. Referring to FIG. 3, movable arm 1100 can be any one of movable arms 118, 120, 122 and 124 of FIG. 1A and multi-purpose wheel 1102 can be the corresponding one of multi-purpose wheels 110, 112, 114 and 116. Movable arm 1100 is a beam shaped structure with an embedded axial shaft 1104 and a gearbox 1106 for transferring motion-driven rotation from driving motor/engine of the multi-purpose vehicle to multi-purpose wheel 110. Particularly, first gearbox 1106 is used to transfer rotational motion from engine to axial shaft 1104. Axial shaft 1104 is capable of free-axial rotational on a plurality of bearings 1108 which supports movable arm 1100 in the housing and facilitate its free rotation. Finally, the driving rotational motion is transferred to the wheel 1102 via second gearbox 1110.

Figure 12:
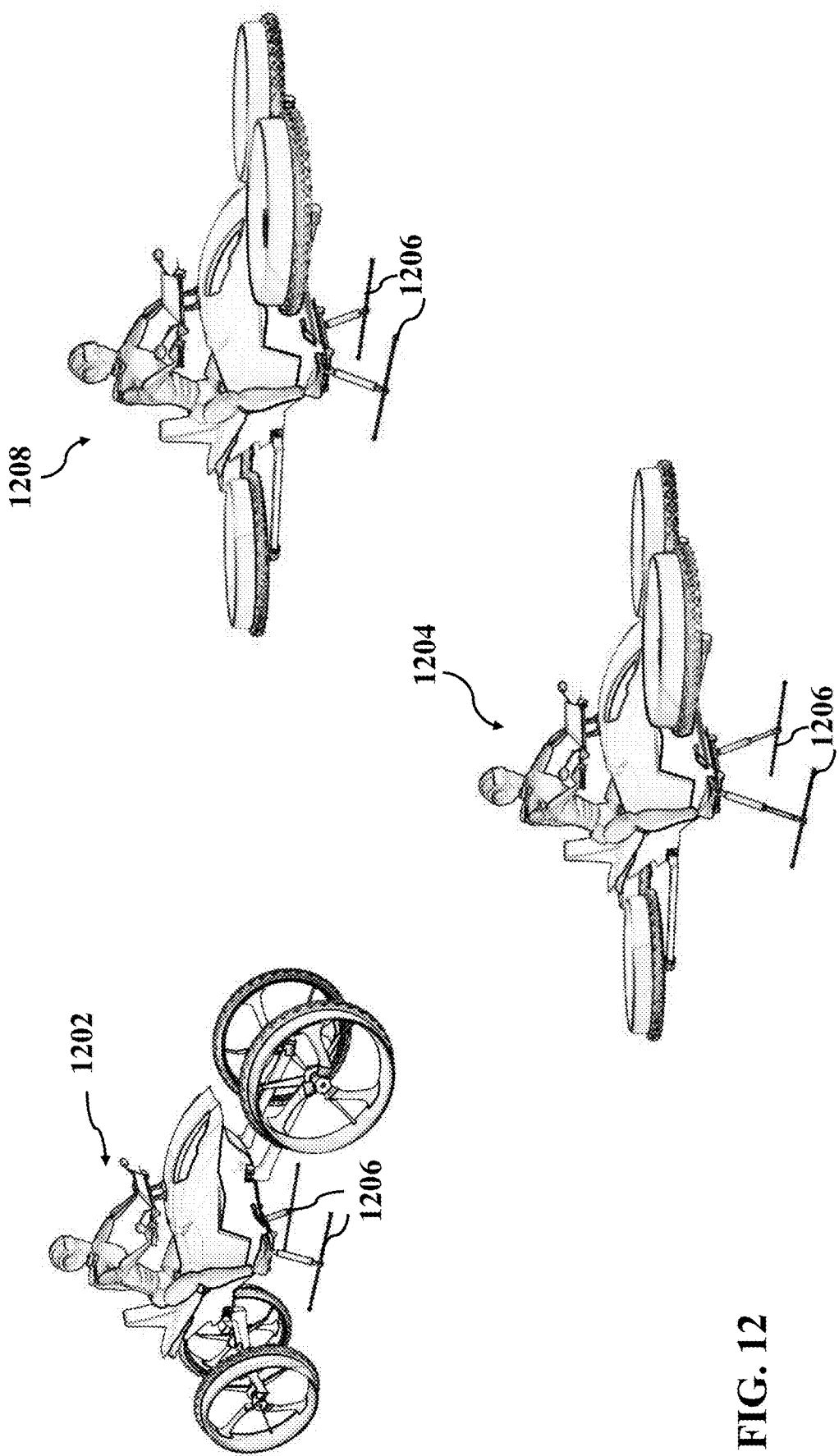
FIG. 12 illustrates a visual example of a transition of multi-purpose vehicle of FIGS. 1A-B from driving transportation mode to flying transportation mode, according to one aspect of the present disclosure.

FIG. 12 illustrates a visual example of a transition of multi-purpose vehicle of FIGS. 1A-B from driving transportation mode to flying transportation mode, according to one aspect of the present disclosure. Referring to FIG. 4, from left to right, it is shown that multi-purpose vehicle 100 transitions from driving mode to flying mode. At 1202, multi-purpose vehicle 100 is in driving mode and may be moving or be stationary. Then at 1204, the landing gear 1206 (which can be the same as landing gear 132) is extended to support the weight of multi-purpose vehicle 100 during transition to flying mode. Finally, at 1208, multi-purpose vehicle 100 takes off (e.g., via controlling engagement mechanism 154 to disengage driving blades 152 and turning flying propeller 150 on) and the landing gear 1206 is retracted.

Figure 13:
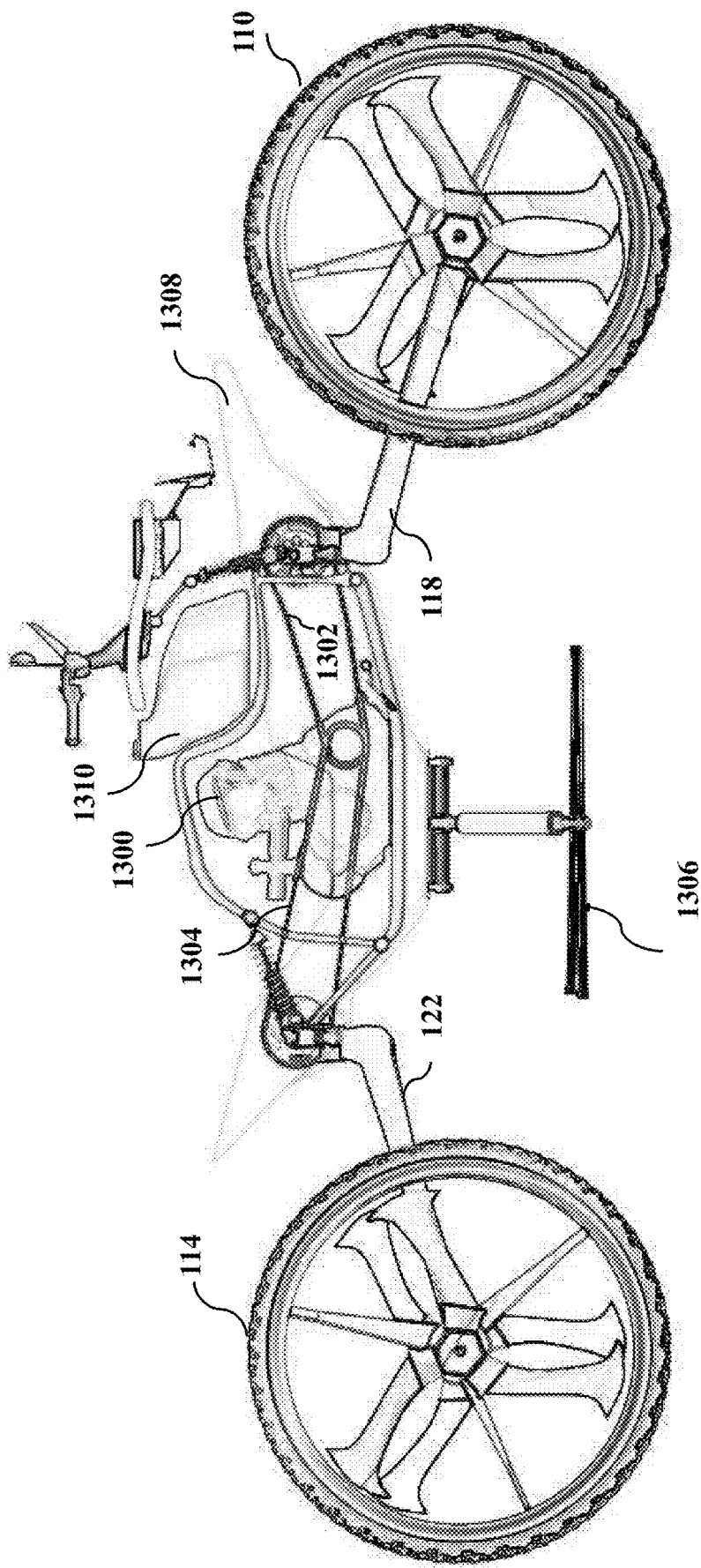
FIG. 13 is a side view of multi-purpose vehicle of FIG. 1A-B in driving mode, according to one aspect of the present disclosure.

FIG. 13 is a side view of multi-purpose vehicle of FIG. 1A-B in driving mode, according to one aspect of the present disclosure. The engine turning power 1300 is transferred to the front multi-purpose wheels 110 and 112 (not shown) and the back multi-purpose wheels 114 and 116 (not shown) using front roller chain 1302 and rear roller chain 1304. Front roller chain 1302 transfers engine's turning axle rotation to front multi-purpose wheels 110 and 112 and rear roller chain 1304 transfers engine's turning axle rotation to the rear multi-purpose wheels 110 and 112. An automatic transmission engaging mechanism (not shown) is positioned between engine's rotary axle and a gearbox. The landing gear 1306 (same as landing gear 132 of FIG. 1A) is mounted under the main body cover 1308. The fuel tank 1310 may be placed above central frames but can be placed in another location based on design choice or practically considerations.

Figure 14:
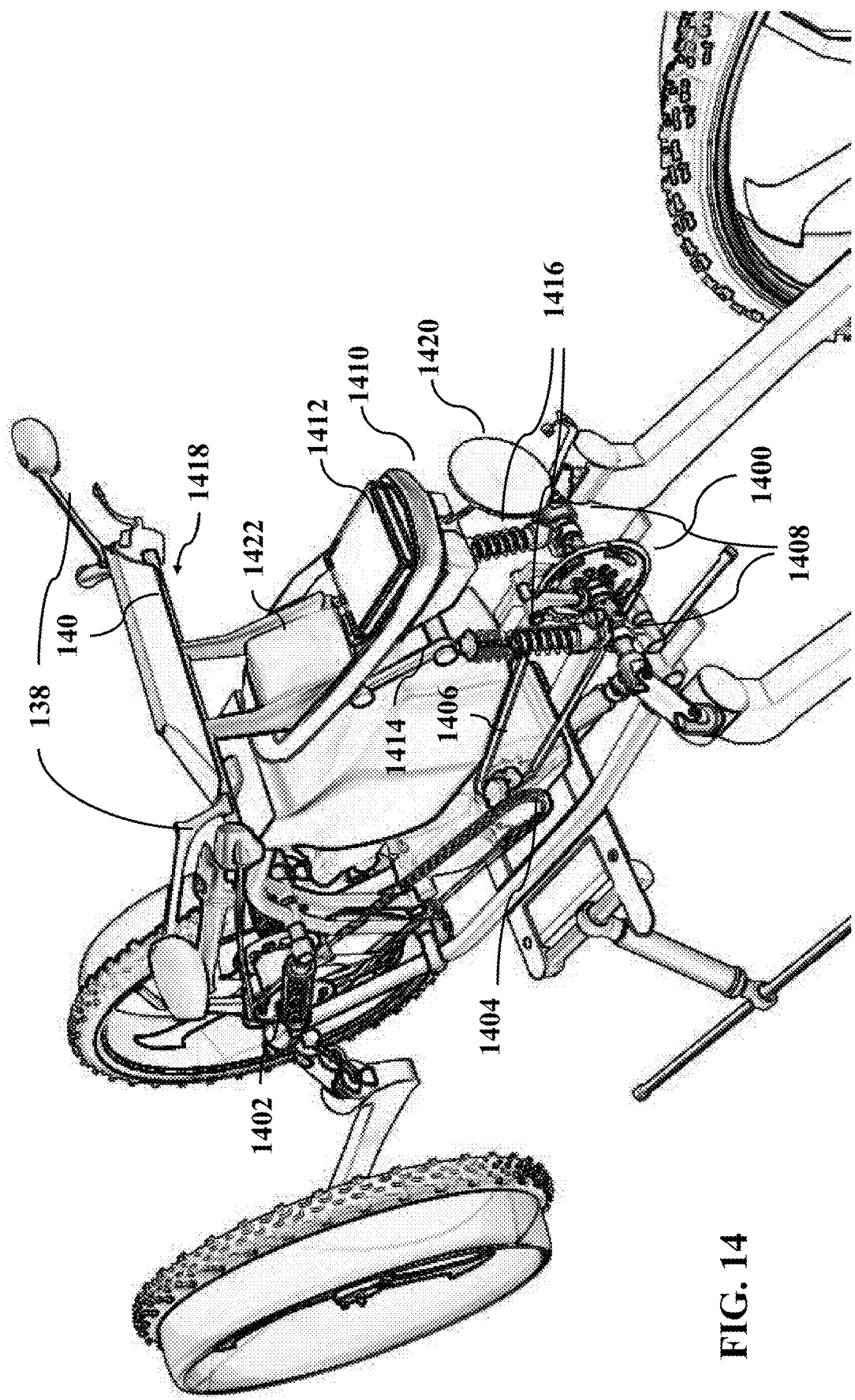
FIG. 14 is a top view of multi-purpose vehicle of FIG. 1A-B in driving mode, according to one aspect of the present disclosure.

FIG. 14 is a top view of multi-purpose vehicle of FIG. 1A-B in driving mode, according to one aspect of the present disclosure. Referring to FIG. 14, front sprocket 1400 and rear sprocket 1402 are connected by a gearbox 1404. Gearbox 1404 and front sprocket 1400 are connected by front roller chain 1406. Front sprocket 1400 delivers the rotation to the front axial shaft 1408. The nose bay 1410 is the keeping frame for system avionics and the central computer 1412. The nose bay 1410 is connected from one end to the triple clamps 82. Front spring struts 1416 are supported at their tops by triple clamps 1414. Triple clamps 1414 affixed to the handlebar 1418. The computer and avionics 1412 has a receiver dish 1420 for telecommunication with cellphone operators and autonomous guidance and navigation through any known or to be developed wireless communication protocol. The auto data recorder 1422 is placed as a separate element right beneath the handlebar 138. Auto data recorder 1422 functions like a black box in conventional aircrafts.

Figure 15:
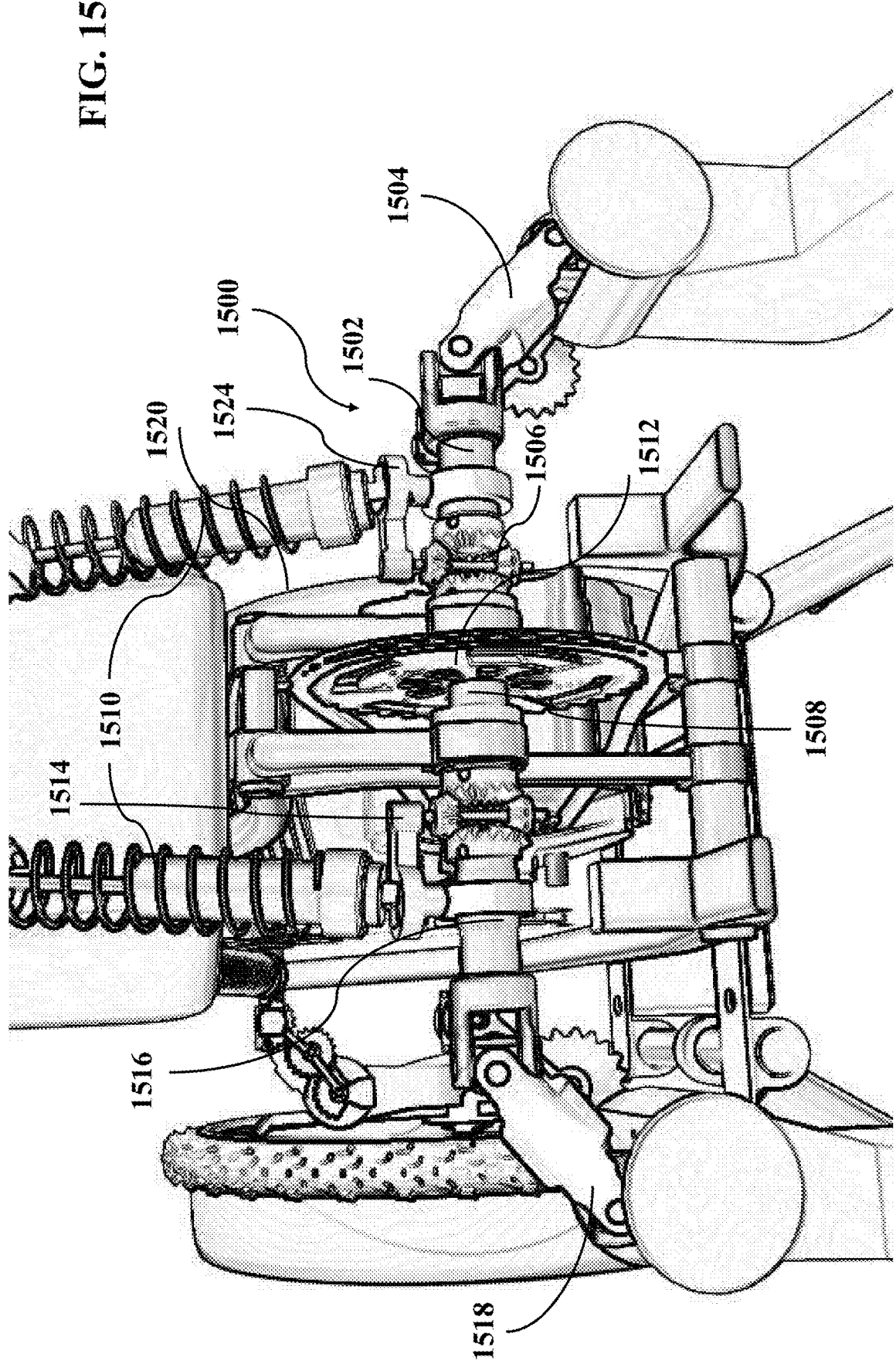
FIG. 15 illustrates operation of multi-purpose vehicle of FIG. 1A-B, according to one aspect of the present disclosure.

FIG. 15 illustrates operation of multi-purpose vehicle of FIG. 1A-B, according to one aspect of the present disclosure. As shown in FIG. 15, the front axial shaft 1500 is comprised of three separate parts. The left part 1502 is connected to the left universal joint 1504 from left side and connected to the left planet pin 1506 from the right side. The middle part 1508 is connected to front spring struts 1510 and the sprocket 1512 and both planet pins 1506 and 1514 from the end. The right part 1516 is connected to the right universal joint 1518 from left side and connected to the right planet pin 1514 from the left side. The front brocket 1512 transfers the rotational power to the front axial shaft 1500. Thereby, the central shaft 1500 transfers the rotation to both universal joints 1504 and 1518. They transfer the turning power to the axial shafts by the embedded gearboxes in movable arms. The central front shaft 1500 is connected to the central frames 1520 by a pair of bearings 1522. The hinge joints 1524 are connected from one side to the front spring struts 1510 and the other side to the planet pinions 1506 and 1514. The universal joints are double Cardan type of universal joints. Double Cardan joints allow for adjustment of the angle between input and output shafts even during rotary transmission allowing the shafts to rotate according to each axis during their operation. The hinge joints can be rotated around planet pin 1506 and 1514.

Figure 16:
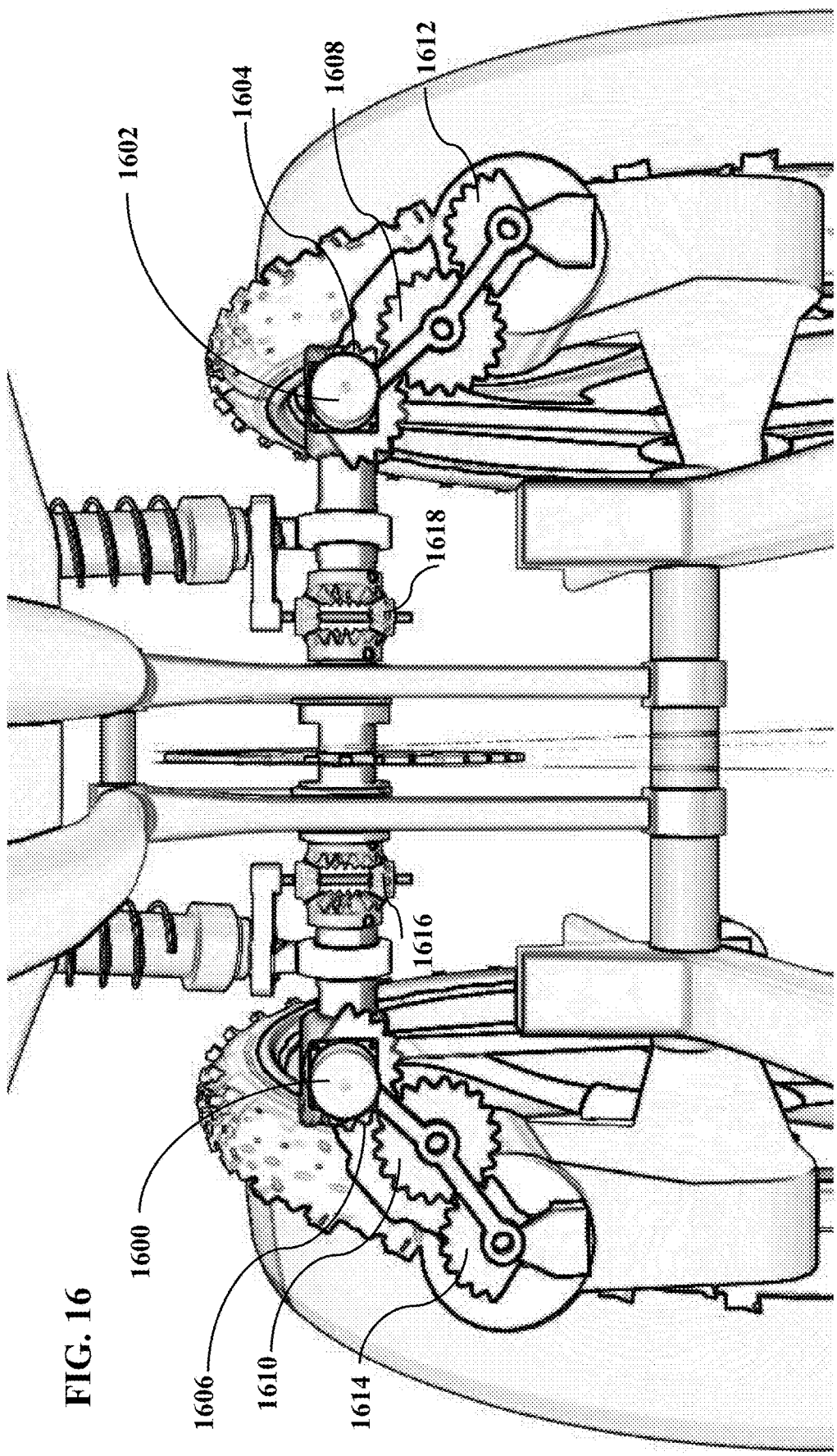
FIG. 16 illustrates operation of multi-purpose vehicle of FIG. 1A-B, according to one aspect of the present disclosure.

FIG. 16 illustrates operation of multi-purpose vehicle of FIG. 1A-B, according to one aspect of the present disclosure. As shown in FIG. 16, actuator motors 1600 and 1602 actuate the movable left arm 118 and the right movable arm 122 simultaneously. The actuator motors 1600 and 1602 rotate a specialized gear train. The first driver gears 1604 and 1606 rotate the middle driven gears 1608 and 1610. Then, the middle driven gears drive the third driven gears 1612 and 1614. Third driven gears 1612 and 1614 transfer the driven rotation to the left movable arm 118 and the right movable arm 122. Focusing on the right movable arm 122, when the first driver gear 1604 is rotated counter clockwise the right arm is opened but when it is rotated clockwise the right arm is closed. With regard to the left movable arm 118, when the first driver gear 1606 is rotated clockwise the left arm is opened but when it is rotated counter clockwise the left arm is closed. The planet pinions 1616 and 1618 have two functionalities. The first function is to balance the increase in the speed of one wheel by decreasing the speed of the other especially during a turn. The second functionality is for steering. Since all Wheels remain on the ground during mobility and drive mode, the driver can control the ground orientation through the handlebars or the steering wheel (e.g., handlebar 141 of FIG. 1A). The handlebar is directly used for rotating the fork tube around its center axis which in turn rotates the front wheel in the same direction. The steering wheel actuates another actuator motor and this motor turn the fork and the wheels. However, since this vehicle has at least one front movable arm then the best way to change the vehicle orientation during the mobility mode is to rotate the arm around a its pivotal point or for more than one movable arm a pair of planet pinions can be used for pivotal rotation.

Figure 17:
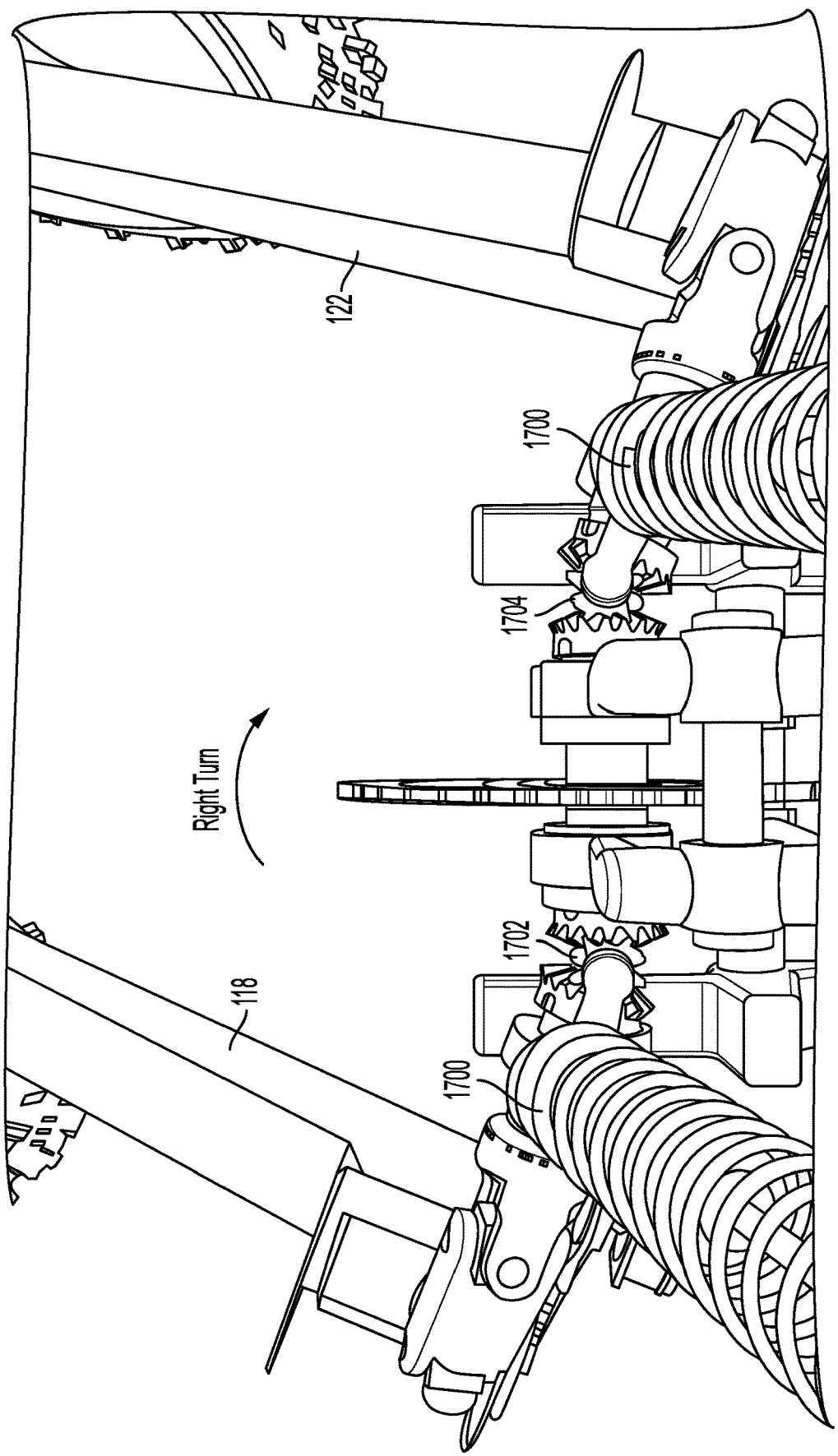
FIG. 17 illustrates operation of multi-purpose vehicle of FIG. 1A-B, according to one aspect of the present disclosure.

FIG. 17 illustrates operation of multi-purpose vehicle of FIG. 1A-B, according to one aspect of the present disclosure. FIG. 17 shows how the steering system works. In mobility mode, for example when the pilot rotates the handlebar 141 clockwise, the triple clamps 1414 and the spring struts 1700 (which may be the same as spring struts 1416 of FIG. 14 and 1510 of FIG. 15) that have a solid connection with each other are also rotated clockwise and finally the left arm 118 is rotated clockwise around the left planet pinion 1702 while the right arm is also rotated clock wise around the right planet pinion 1704.

Figure 18:
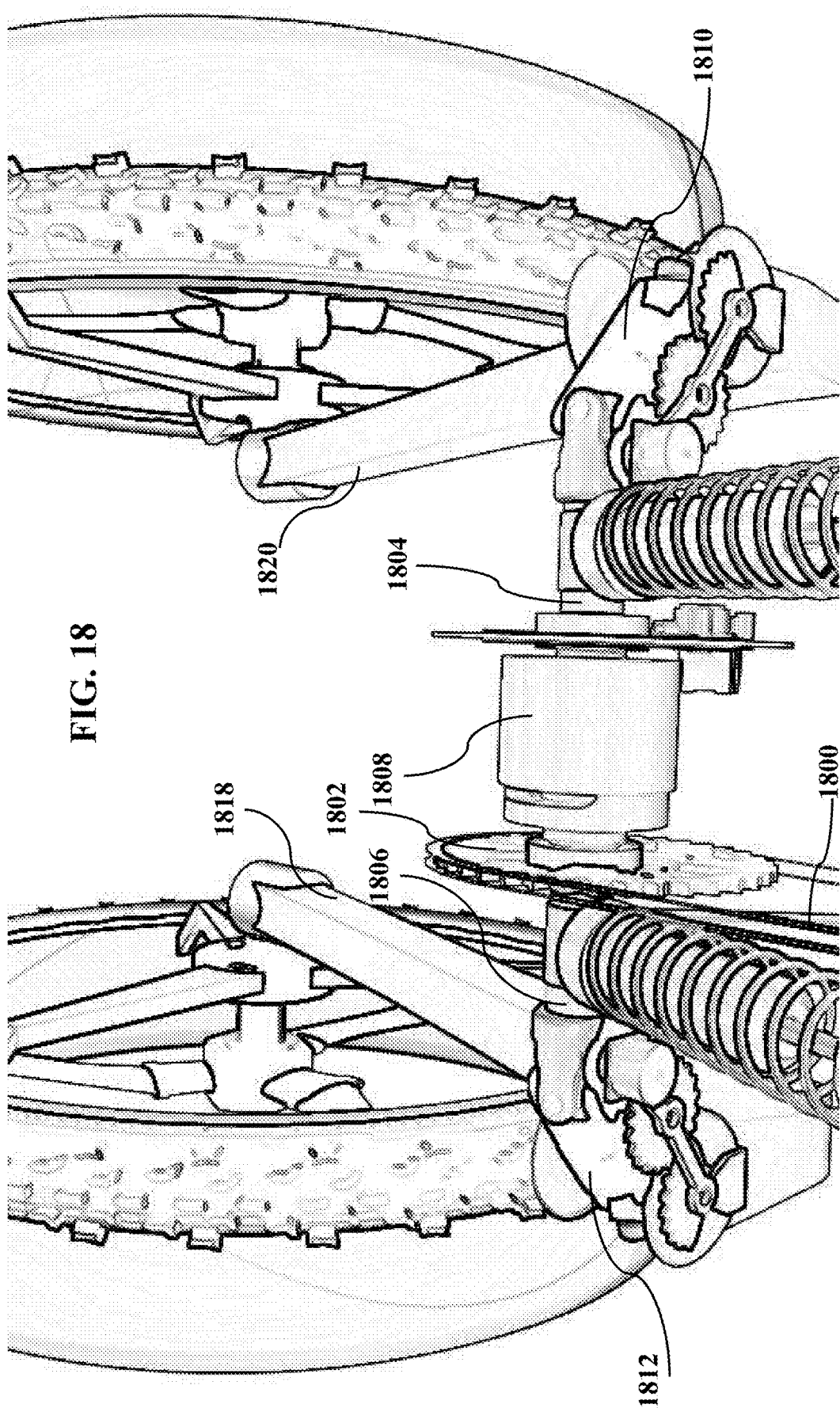
FIG. 18 illustrates operation of multi-purpose vehicle of FIG. 1A-B, according to one aspect of the present disclosure.

FIG. 18 illustrates operation of multi-purpose vehicle of FIG. 1A-B, according to one aspect of the present disclosure. FIG. 18 shows the rear cross section of the corresponding multi-purpose vehicle such as multi-purpose vehicle 100 of FIG. 1A. The rear roller chain 1800 transfers the engine turning power to the rear sprocket 1802. A rear axial shaft is comprised of two separate parts, a left part 1804 and a right part 1806. Left part 1804 is connected from right side to the rear differential 1808 and from left side to the left of a double Cardan universal joint 96a. The right part 1806 is connected from left side to the rear sprocket 1802 and the rear differential 1808 and from right side to the right double Cardan universal joint 1812. A pair of actuator motors 1814 and 1816 retract rear left movable arm 1818 and rear right movable arm 1820. The actuator motors rotates one specialized gear train. The retracting mechanism for rear movable arms is the same as the mechanism for retracting front arms described above.

Figure 19:
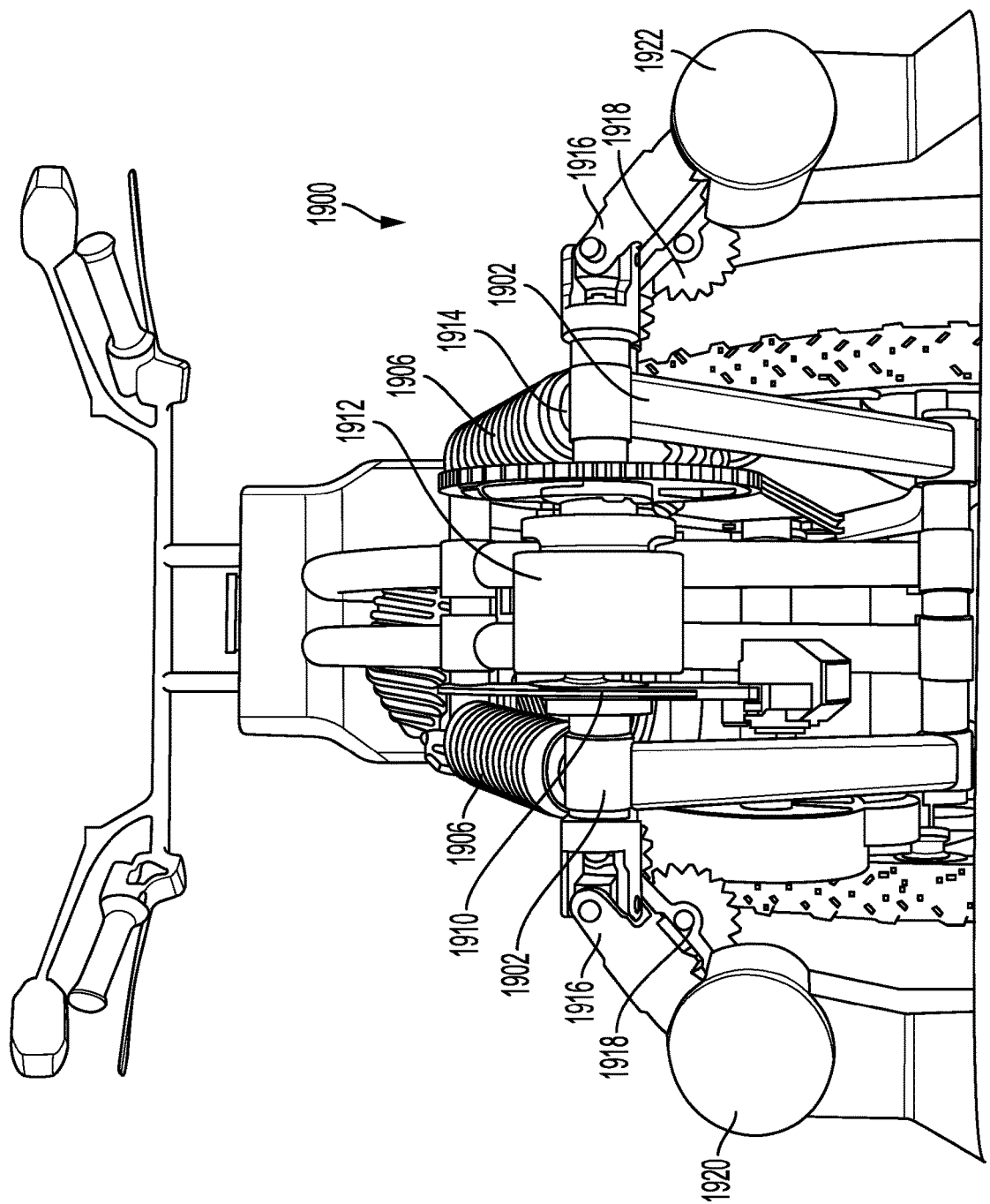
FIG. 19 illustrates operation of multi-purpose vehicle of FIG. 1A-B, according to one aspect of the present disclosure.

FIG. 19 illustrates operation of multi-purpose vehicle of FIG. 1A-B, according to one aspect of the present disclosure. In FIG. 19, the rear axial shaft 1900 is connected to the supporting frames 1902 from button and is pivoted to central frames 1904 by rear spring struts 1906. The brake caliper 1908 is connected to the brake disk 1908. The rear roller chain 1914 transfers the engine turning power to the rear sprocket 1910. The rear axial shaft 1900 is comprised of two separate parts. The left part is connected from right side to the rear differential 1912 and from left side to the left of a double Cardan universal joint 1916. The right part is connected from left side to the rear sprocket 1910 and the rear differential 1912 and from right side to the right double Cardan universal joint 1916. A pair of engagement motors 1918 retract rear left robotic 1920 and rear right robotic arm 1922.

Figure 20A:
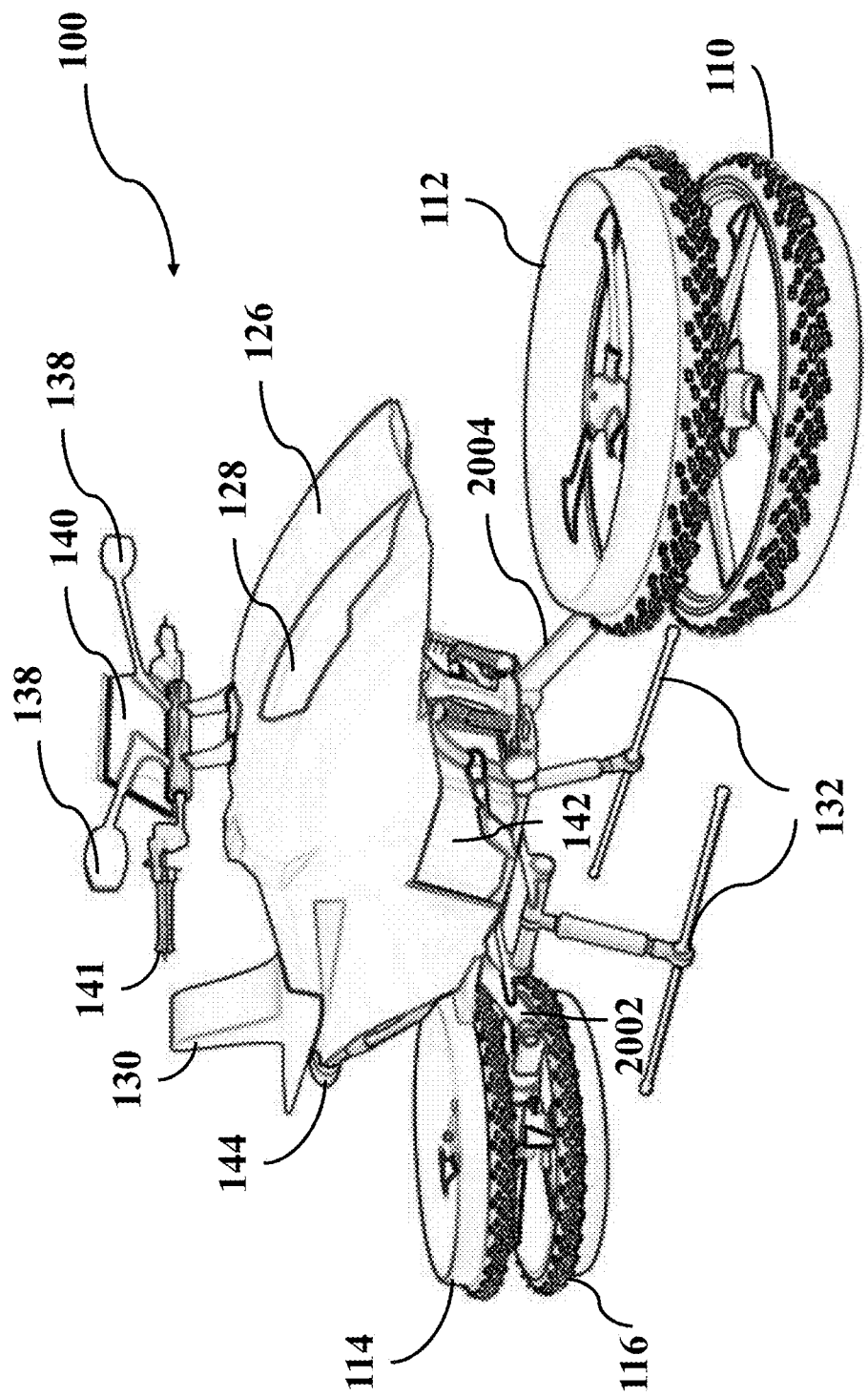
FIGS. 20A-B illustrate an example configuration of movable arms of multi-purpose vehicle of FIG. 1A, according to an aspect of the present disclosure.
Figure 20B:
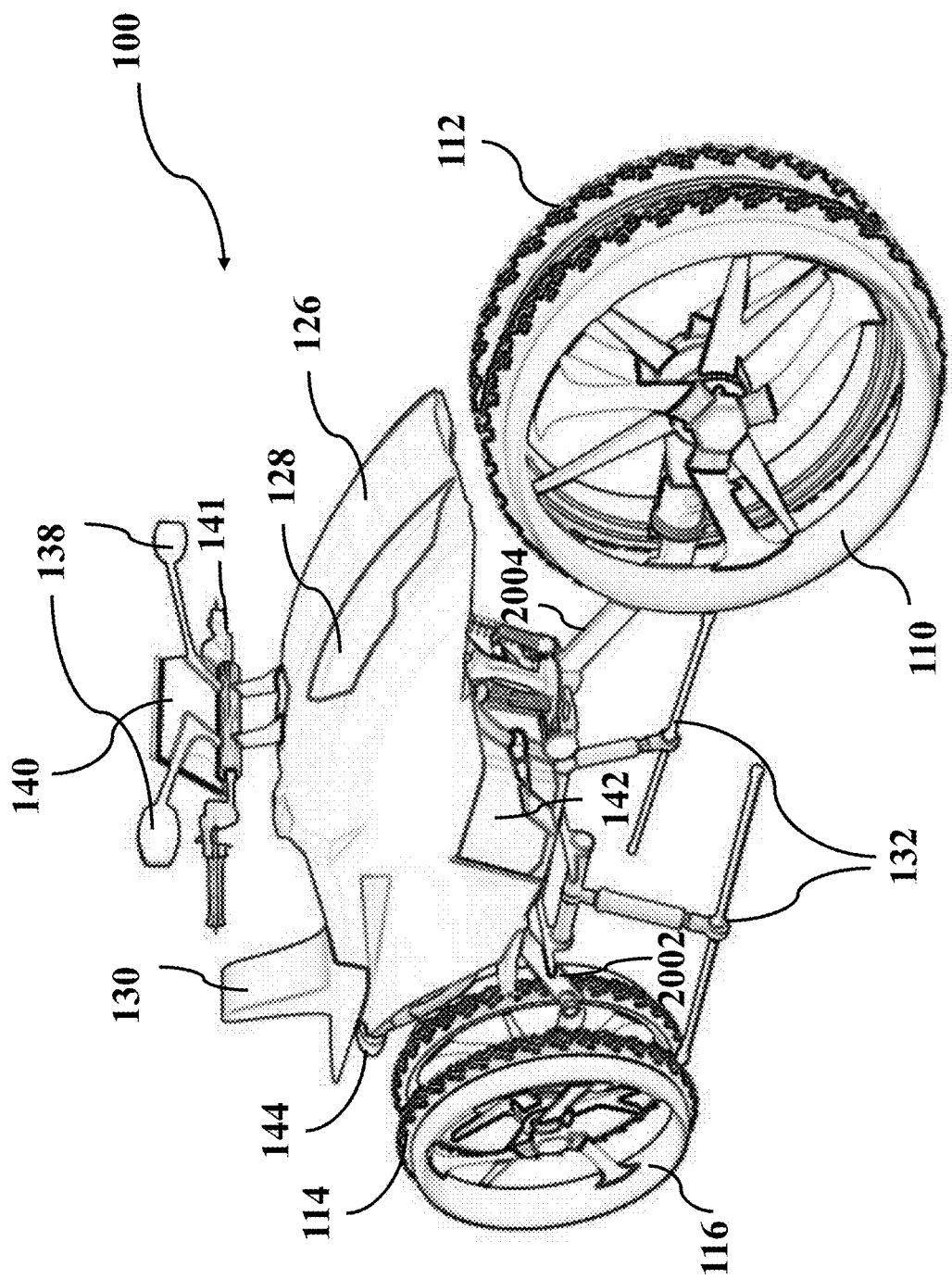

FIGS. 20A-B illustrate an example configuration of movable arms of multi-purpose vehicle of FIG. 1A, according to an aspect of the present disclosure. All elements of FIGS. 20A-B that have the same reference numeral as their corresponding counterparts in FIG. 1A, will not be further described for sake of brevity. As noted above with respect to FIG. 1A, instead of each of wheels 110, 112, 114 and 116 having a dedicated movable arm (such as movable arms 118, 120, 122 and 124 in FIG. 1A), the rear pair of wheels (wheels 114 and 116) may share a single movable arm 2002 and the pair of front wheels (wheels 110 and 112) may share a single movable arm 2004, as shown in FIG. 20A. Each of movable arms 2002 and 2004 may have the same number of elements and components as movable arms 118, 120, 122 and 124. Therefore, movable arm 2002 may have elements 2002a-g similar to elements 118-a-g of movable arm 118 of FIG. 1A and movable arm 2004 may have elements 2004a-g similar to elements 118a-g of movable arm 118 of FIG. 1A.

In example configuration of FIG. 20A, each of front and rear movable arms 2002 and 2004 may have a fork shaped front tip at the end of each of which can be the same as gearbox 118g is attached for controlling one of the wheels attached thereto. Accordingly, in contrast to movable arms 118, 120, 122 and 124, each of movable arms 2002 and 2004 may have two gearboxes similar to gearbox 118g. By using front and rear movable arms, costs associated with manufacturing and building multi-purpose vehicle 100 and the weight thereof may be reduced.

While FIG. 20A illustrates a vertical orientation of wheels 110, 112, 114 and 118 connected to movable arms 2002 and 2004 (in driving mode), FIG. 20B illustrates horizontal orientation of wheels 110, 112, 114 and 116 during takeoff and/or flying mode. Change in orientation of wheels 110, 112, 114 and 116 can be actuated using movable arms 2002 and 2004 in a similar manner as described above.

Figure 21:
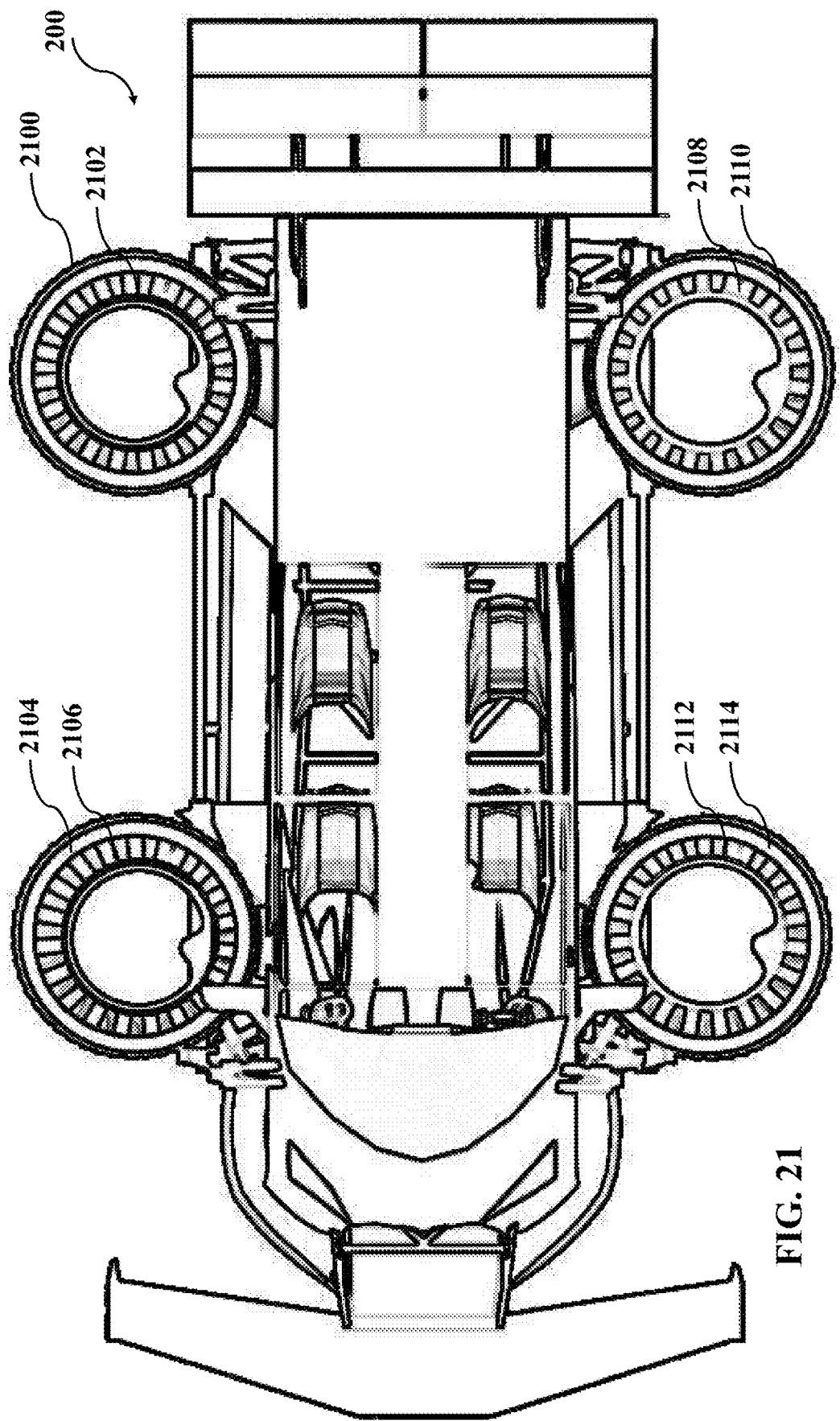
FIG. 21 illustrates another example of a multi-purpose vehicle, according to an aspect of the present disclosure.

FIG. 21 illustrates another example of a multi-purpose vehicle, according to an aspect of the present disclosure. Multi-purpose vehicle 200 of FIG. 21 is the same as multi-purpose vehicle 200 of FIG. 2 except that wheels 250 in FIG. 2 are replaced with multi-purpose wheels 2100, 2104, 2110 and 2114, which are bladeless electromagnetic wheels where the need for radially connected blades (for driving blades, flying propeller and/or sailing propeller) is replaced with electromagnetically operated wheels having a hollow center. The high pressure jet stream generate thrust by passing the pressurized air flow through a set of aerodynamic vents for accelerating the air flow and increasing the resulted thrust. This jet stream can be either produced by an inner turbine with free motion and a plurality of blades which can be actuated using any type of power source such as power source 142 of FIG. 1 (e.g., turbine 2102 in multi-purpose wheel 2100, turbine 2106 in multi-purpose wheel 2104, turbine 2108 in multi-purpose wheel 2110 and turbine 2112 in multi-purpose wheel 2114 shown in FIG. 21) or can be pushed in from a secondary source of jet propulsion.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A multi-purpose tool comprising:
    a first set of blades configured to enable an object to which the multi-purpose tool is attached to operate in a first mode of transportation;
    a second set of blades configured to enable the object to operate in a second mode of transportation;
    a third set of blades configured to enable the object to operate in a third mode of transportation, the third mode of transportation is a sailing mode of transportation; and
    a single engagement mechanism coupled to the first set of blades, the second set of blades, and the third set of blades for switching operation of the object between the first mode of transportation, the second mode of transportation, and the third mode of transportation.

2. The multi-purpose tool of claim 1, wherein the first mode of transportation is a driving mode of transportation and the second mode of transportation is a flying mode of transportation.

3. The multi-purpose tool of claim 1, wherein the object is one of a drone, a motorcycle, a car or a boat.

4. The multi-purpose tool of claim 1, wherein the engagement mechanism is connected to a power source of the object via a movable arm.

5. The multi-purpose tool of claim 4, wherein the movable arm is configured to adjust orientation of the multi-purpose tool when switching from the first mode of transportation and the second mode of transportation.

6. The multi-purpose tool of claim 1, wherein the multi-purpose tool is a wheel.

7. The multi-purpose tool of claim 6, wherein the first set of blades and the second set of blades are radially connected to inner walls of a rim of the wheel and are coupled to the engagement mechanism at a center of the wheel.

8. The multi-purpose tool of claim 1, wherein the engagement mechanism is an electromagnetic clutch.

* * * * *